(12) United States Patent  (10) Patent No.: US 8,242,724 B2
Sakai                      (45) Date of Patent:     Aug. 14, 2012

(54) DRIVING DEVICE FOR SYNCHRONOUS MOTORS

(75) Inventor: Kouji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 731 days.

(21) Appl. No.: 12/382,496

(22) Filed: Mar. 17, 2009

(65) Prior Publication Data

US 2009/0237020 A1   Sep. 24, 2009

(30) Foreign Application Priority Data

Mar. 18, 2008  (JP) .................................. 2008-69465
Jan. 19, 2009  (JP) .................................. 2009-8488

(51) Int. Cl.
*H02P 6/04* (2006.01)

(52) U.S. Cl. ......... 318/400.11; 318/400.03; 318/400.17; 318/400.3

(58) Field of Classification Search ............. 318/400.03, 318/400.11, 400.17, 400.27, 722
See application file for complete search history.

(56) References Cited

U.S. PATENT DOCUMENTS

| 4,262,236 | A | * | 4/1981 | Gelenius et al. | ......... 318/400.09 |
| 5,612,599 | A | | 3/1997 | Itami et al. | |
| 6,066,928 | A | * | 5/2000 | Kinoshita et al. | ............. 318/139 |
| 6,137,704 | A | | 10/2000 | Ito et al. | |
| 6,320,775 | B1 | | 11/2001 | Ito et al. | |
| 7,098,624 | B2 | * | 8/2006 | Kusaka | .......................... 318/727 |
| 8,040,089 | B2 | * | 10/2011 | Sakai | .......................... 318/400.09 |
| 2002/0070715 | A1 | * | 6/2002 | Sasaki et al. | ..................... 322/28 |
| 2003/0057914 | A1 | * | 3/2003 | Kamatsu et al. | ............... 318/727 |
| 2009/0033294 | A1 | | 2/2009 | Odajima et al. | |

FOREIGN PATENT DOCUMENTS

| JP | A-09-117170 | 5/1997 |
| JP | A-2002-027761 | 1/2002 |
| JP | A-2004-104997 | 4/2004 |
| JP | A-2004-311090 | 11/2004 |
| JP | A-2005-184947 | 7/2005 |
| JP | A-2007-135250 | 5/2007 |
| JP | A-2007-236048 | 9/2007 |

OTHER PUBLICATIONS

Notice of Rejection issued from the Japanese Patent Office mailed on Jan. 6, 2010 in the corresponding Japanese patent application No. 2009-008488 (with English translation).
Office Action mailed Mar. 27, 2012 in corresponding JP Application No. 2010-034645 (and English translation).

* cited by examiner

*Primary Examiner* — Bentsu Ro
*Assistant Examiner* — Thai Dinh
(74) *Attorney, Agent, or Firm* — Posz Law Group, PLC

(57) ABSTRACT

A driving device for three-phase alternating current synchronous motors controls state of charge of a capacitor, and a three-phase alternating current synchronous motor is started prior to the operation of the synchronous motor. Prior to control by a normal operation control unit, the state of charge of the capacitor is controlled by an initial state control unit and a synchronization control unit. Passage of large current through the capacitor immediately after the start of the execution of control by the normal operation control unit is suppressed. As a result, the operating state of the three-phase alternating current synchronous motor does not become unstable and the execution of control by the normal operation control unit can be started with the output voltage of the capacitor stable.

45 Claims, 13 Drawing Sheets

DRIVING DEVICE FOR SYNCHRONOUS MOTORS

CROSS REFERENCE TO RELATED APPLICATION

This application is based on and incorporates herein by reference Japanese Patent Applications No. 2008-69465 filed on Mar. 18, 2008 and No. 2009-8488 filed on Jan. 19, 2009.

FIELD OF THE INVENTION

The present invention relates to a driving device for synchronous motors that controls a synchronous motor with a star-connected stator coil.

BACKGROUND OF THE INVENTION

A conventional driving device for a synchronous motor includes an inverter circuit, which is comprised of six transistors and six diodes, and a control circuit that controls the inverter circuit as disclosed in US 2002/0070715 A1 (JP 2002-10654 A).

The inverter circuit is formed by connecting three pairs of series-connected transistor in parallel between a positive pole bus and a negative pole bus. In addition, one diode is connected in parallel with each transistor.

A direct current power supply is connected between the neutral point of the stator coil and the negative pole bus of the inverter circuit. A capacitor is connected between the neutral point of the stator coil and the positive pole bus of the inverter circuit. For this reason, a voltage difference equivalent to the sum of the supply voltage produced at the direct current power supply and the voltage produced at the capacitor is produced between the positive pole bus and the negative pole bus.

The control circuit causes the six transistors to perform switching operation and thereby outputs three-phase alternating currents to a three-phase alternating current synchronous motor based on the voltage difference between the positive pole bus and the negative pole bus. Therefore, the three-phase alternating current synchronous motor can be operated with a voltage higher than the supply voltage produced by the direct current power supply.

When, of the six transistors, the transistors connected to the negative pole bus are turned on, a current is passed through the stator coil. Therefore, magnetic energy is stored in the stator coil based on the current.

When the transistors connected to the negative pole bus are turned off, a current based on the above magnetic energy flows from the stator coil to the capacitor by way of the diodes on the positive pole bus side and the positive pole bus. Therefore, three-phase alternating currents are passed through the stator coil and electric charge is stored in the capacitor by causing the six transistors to perform switching operation.

In the above driving device, when control of the inverter circuit is started under the condition that electric charge has not been stored in the capacitor, a large rush current flows from the stator coil to the capacitor by way of the diodes on the positive pole bus side and the positive pole bus at the time when the transistors connected to the negative pole bus transition from on to off. In conjunction therewith, the output voltage of the capacitor largely fluctuates.

Therefore, the alternating currents outputted from the inverter circuit to the three-phase alternating current synchronous motor becomes unstable. This will cause vibration in the three-phase alternating current synchronous motor.

SUMMARY OF THE INVENTION

It is therefore an object of the invention to provide a driving device for synchronous motors, wherein the state of charge of a capacitor is controlled prior to the operation of a synchronous motor.

According to the present invention, a driving device for synchronous motors is provided to rotate a rotor by a rotating magnetic field produced by a star-connected stator coil. The driving device comprises an inverter circuit, a capacitor and a normal operation controlling unit. The inverter circuit has a plurality of pairs of switching elements connected in series, and the plurality of pairs of switching elements are connected in parallel between a positive pole bus and a negative pole bus. The normal operation controlling unit is configured to cause the plurality of switching elements of the inverter circuit to perform switching operation and thereby output alternating current to the stator coil based on an output voltage of a power supply device and an output voltage of the capacitor to produce the rotating magnetic field by the stator coil.

In one aspect of the present invention, the driving device further has an initial state controlling unit configured to cause the switching elements to perform switching operation prior to execution of control by the normal operation controlling unit and thereby control state of charge of the capacitor.

In another aspect of the present invention, the driving device further has an initial state and synchronization controlling unit configured to cause the switching elements to perform switching operation prior to execution of control by the normal operation controlling unit and thereby synchronize the rotor with a rotating magnetic field produced by the stator coil and further control state of charge of the capacitor.

In still another aspect of the present invention, the driving device further has an initial state and positioning controlling unit configured to cause the switching elements to perform switching operation prior to execution of control by the normal operation controlling unit and thereby attract the rotor to a magnetic field produced by the stator coil to position the rotor and further control the state of charge of the capacitor.

BRIEF DESCRIPTION OF THE DRAWINGS

The above and other objects, features and advantages of the present invention will become more apparent from the following description made with reference to the accompanying drawings. In the drawings.

DETAILED DESCRIPTION OF THE PREFERRED EMBODIMENTS

First Embodiment

Figure 1:
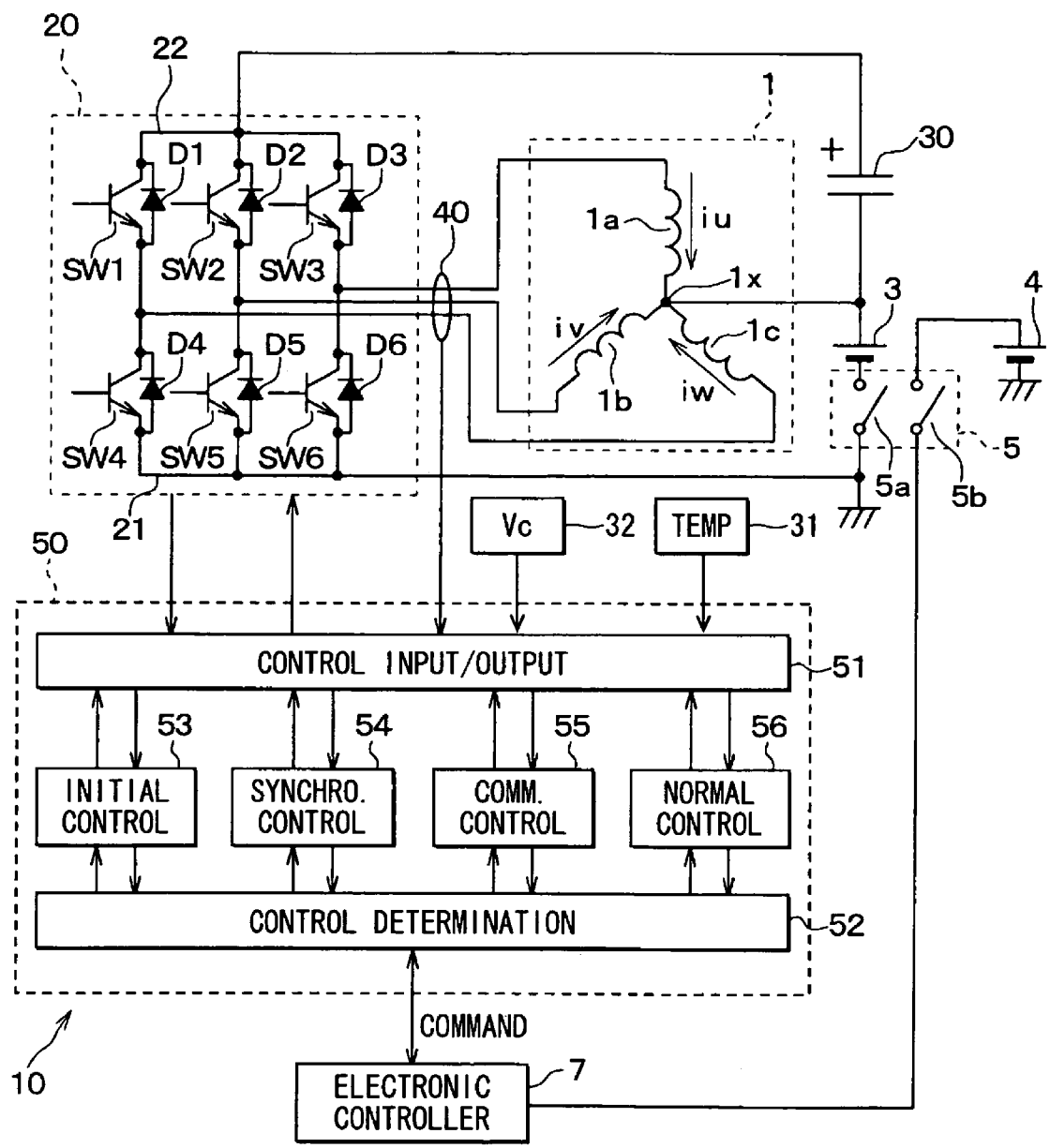
FIG. 1 is a circuit diagram illustrating a driving device for three-phase alternating current synchronous motors in a first embodiment of the invention.

Referring first to FIG. 1, a driving device 10 is configured to output three-phase alternating currents to a three-phase alternating current synchronous motor based on direct current voltage and thereby drive the three-phase alternating current synchronous motor. The rotating shaft of the three-phase alternating current synchronous motor is connected with a load, such as a compressor of an air-conditioner.

The three-phase alternating current synchronous motor includes, for example, a rotor (not shown) with a permanent magnet embedded therein and a stator coil 1 that applies a rotating magnetic field to the rotor. The stator coil 1 includes star-connected U-phase coil 1a, V-phase coil 1b, and W-phase coil 1c, which are connected to a neutral point 1x.

In this embodiment, a sensor for detecting information on rotor position is not attached to the three-phase alternating current synchronous motor.

A high-voltage battery 3 is a power supply device connected between the neutral point 1x of the stator coil 1 and ground. Between the high-voltage battery 3 and ground, a switch element 5a of a power switch 5 is placed. The power switch 5 includes a switch element 5b that connects and disconnects the positive terminal of a low-voltage battery 4 and an electronic controller 7 to and from each other. The switch elements 5a, 5b are opened and closed in conjunction with each other by manual operation of a user. The output voltage of the low-voltage battery 4 is set to a value lower than the output voltage of the high-voltage battery 3.

The driving device 10 includes an inverter circuit 20, a capacitor 30, a temperature sensor 31, a voltage sensor 32, a current sensor 40, and a control circuit 50. The inverter circuit 20 outputs three-phase alternating currents to the stator coil 1 based on the output voltage of the high-voltage battery 3 and the voltage difference between the positive electrode and the negative electrode of the capacitor 30.

Specifically, the inverter circuit 20 is comprised of switching elements SW1 to SW6 and diodes D1 to D6.

The switching elements SW1, SW4 are connected in series between a negative pole bus 21 and a positive pole bus 22; the switching elements SW2, SW5 are connected in series between the negative pole bus 21 and the positive pole bus 22; and the switching elements SW3, SW6 are connected in series between the negative pole bus 21 and the positive pole bus 22. The negative pole bus 21 is connected to ground.

The common connection point between the switching elements SW1, SW4 is connected to the W-phase coil 1c; the common connection point between the switching elements SW2, SW5 is connected to the V-phase coil 1b; and the common connection point between the switching elements SW3, SW6 is connected to the U-phase coil 1a.

For the switching elements SW1 to SW6, semiconductor switching elements, such as insulated gate bipolar transistors or field effect transistors, are used.

The diodes D1 to D6 are so disposed that the diodes are connected in inverse parallel with the corresponding switching elements SW1 to SW6. For example, the diode D1 is so disposed that it is connected in parallel with the switching element SW1 and in reverse biased direction. The diodes D1 to D6 let through current so that the respective corresponding switching elements are bypassed.

The capacitor 30, together with the high-voltage battery 3, supplies output voltage to the inverter circuit 20. The positive electrode of the capacitor 30 is connected to the positive pole bus 22 of the inverter circuit 20. The negative electrode of the capacitor 30 is connected to the neutral point 1x of the stator coil 1.

The current sensor 40 detects u-phase current iu, v-phase current iv, and w-phase current iw. The u-phase current iu flows from the common connection point between the switching elements SW3, SW6 to the U-phase coil 1a. The v-phase current iv flows from the common connection point between the switching elements SW2, SW5 to the V-phase coil 1b. The w-phase current iw flows from the common connection point between the switching elements SW1, SW4 to the W-phase coil 1c. With respect to the directions in which the currents iu, iv, iw flow in the figure, the directions of the respective arrows are taken as positive.

The control circuit 50 includes a control input/output unit 51, a control determination unit 52, an initial state control unit 53, a synchronization control unit 54, a forced commutation control unit 55, and a normal operation control unit 56.

The control input/output unit 51 outputs output signals outputted from the control units 53, 54, 55, 56 to the inverter circuit 20. The control input/output unit 51 outputs detection signals from the temperature sensor 31, the voltage sensor 32 and the current sensor 40 to the control units 53, 54, 55, 56.

The control determination unit 52 causes the initial state control unit 53, synchronization control unit 54, forced commutation control unit 55 and normal operation control unit 56 to perform respective operations.

Figure 2:
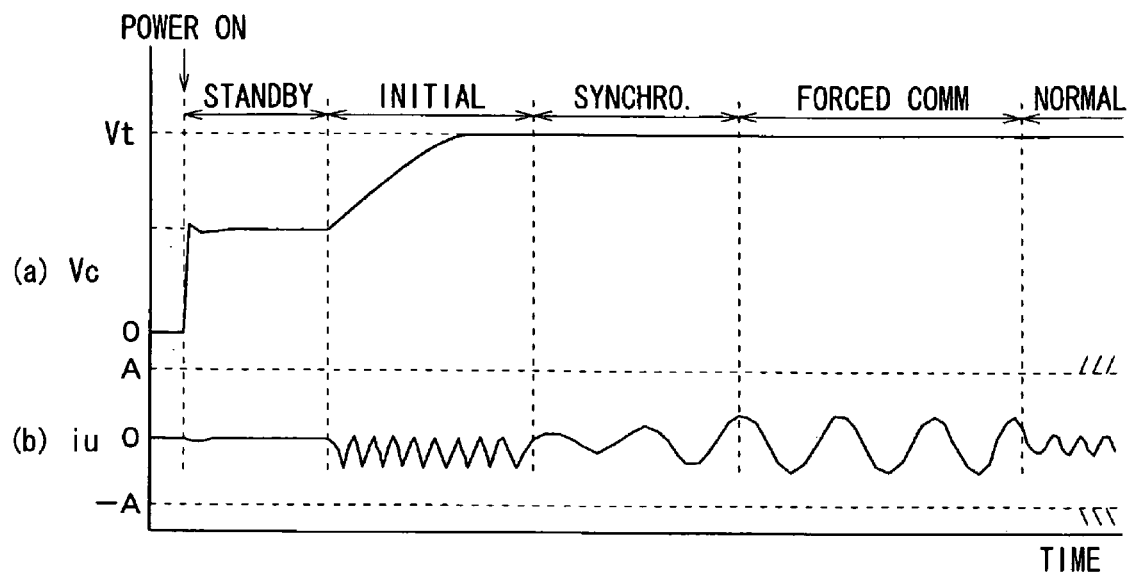
FIG. 2 is a timing chart indicating change in the output voltage of a capacitor and change in U-phase current in the first embodiment.

Operation of the driving device 10 is shown in FIG. 2, in which plotted curve (a) indicates change in the output voltage Vc of the capacitor 30 and plotted curve (b) indicates change in u-phase current iu. The output voltage of the capacitor 30 may be detected by a voltage detector 32.

When the power switch 5 is operated by a user to turn on power (indicated as power-on in FIG. 2), the switch element 5a connects the high-voltage battery 3 and ground. Further, the switch element 5b connects the low-voltage battery 4 and the electronic controller 7.

Figure 3:
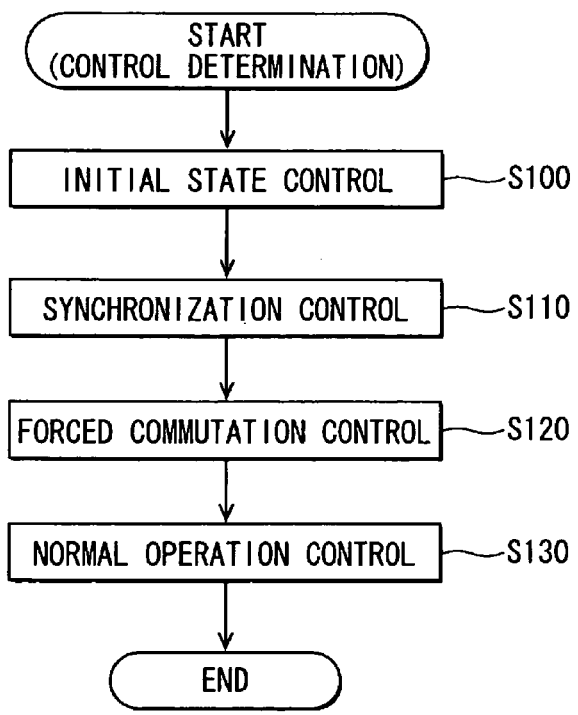
FIG. 3 is a flowchart illustrating control processing executed by a control determination unit of the driving device in FIG. 1.

Then the electronic controller 7 stands by for a certain period of time after the switch element 5b has been closed and then commands the driving device 10 to start control. When the control determination unit 52 of the driving device 10 receives the command to start control from the electronic controller 7, it starts execution of a computer program in accordance with the flowchart illustrated in FIG. 3.

At S100, first, the control determination unit 52 causes the initial state control unit 53 to carry out control. At S110, thereafter, the control determination unit 52 causes the synchronization control unit 54 to carry out control.

Subsequently, the control determination unit 52 causes the forced commutation control unit 55 to carry out the forced commutation control at S120 and then causes the normal operation control unit 56 to carry out the normal operation control at S130.

Hereafter, the control processing by each of the initial state control unit 53, synchronization control unit 54, forced commutation control unit 55, and normal operation control unit 56 is described in detail.

(Initial State Control Unit 53)

Figure 4:
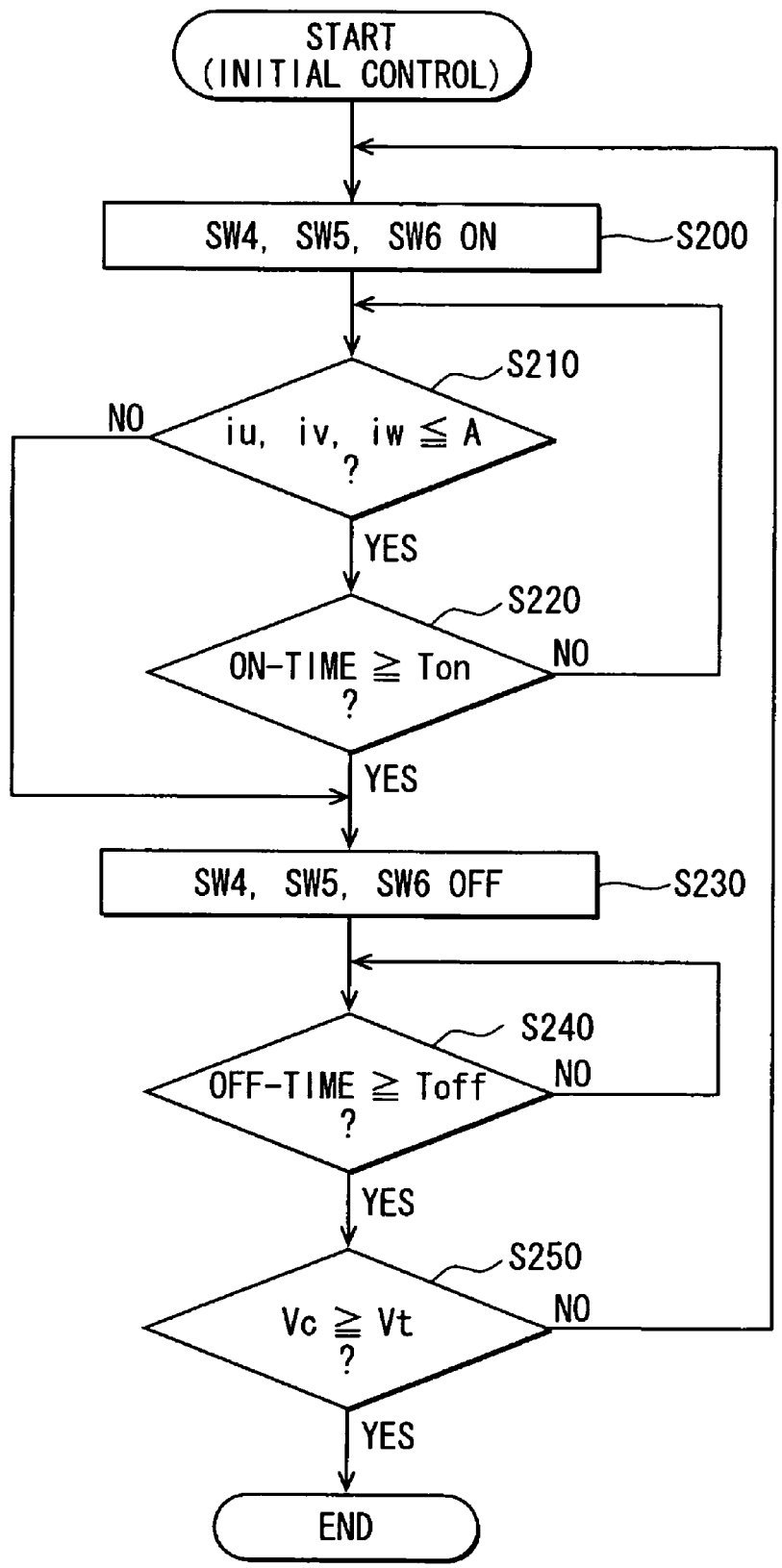
FIG. 4 is a flowchart illustrating control processing by the control determination unit in FIG. 1.

The initial state control unit 53 carries out control processing in accordance with the flowchart illustrated in FIG. 4.

At S200, first, the switching elements SW4 to SW6 are turned on. As a result, current flows from the positive electrode of the high-voltage battery 3 to ground through the U-phase coil 1a and the switching element SW6. For this reason, magnetic energy is stored in the U-phase coil 1a based on the current.

In this embodiment, the switching elements SW4 to SW6 correspond to switching elements on the side of a bus to which either of the positive electrode and the negative electrode of the power supply device (3) is connected.

Further, current flows from the positive electrode of the high-voltage battery 3 to ground through the V-phase coil 1b and the switching element SW5. In addition, current flows from the positive electrode of the high-voltage battery 3 to ground through the W-phase coil 1c and the switching element SW4. As in the case of the U-phase coil 1a, for this reason, magnetic energy is stored in the V-phase coil 1b and the W-phase coil 1c.

At S210, subsequently, the following is determined based on phase currents iu, iv, iw detected by the current sensor 40: whether or not the respective absolute values |iu|, |iv|, and |iw| of the phase currents iu, iv, iw are equal to or lower than limiting current A (FIG. 2). The limiting current A is a current smaller by a predetermined value than the maximum current that can be passed through the three-phase alternating current synchronous motor. The maximum current is the maximum value of current that can be passed through the stator coil 1 so that the three-phase alternating current synchronous motor is free from burning.

When all the absolute values |iu|, |iv|, and |iw| are equal to or lower than the limiting current A, an affirmative determination is made at S210.

At S220, in this case, it is checked whether or not a predetermined time (predetermined on-time Ton) or a longer time has passed after each of the switching elements SW4 to SW6 was turned on. This predetermined on-time Ton is determined beforehand.

When the time that has passed after the switching elements SW4 to SW6 were turned on is shorter than the predetermined on-time, a negative determination is made at S220 and then S210 and S220 are repeated.

When the predetermined on-time Ton or a longer time has passed after the switching elements SW4 to SW6 were turned on, an affirmative determination is made at S220 and the processing proceeds to S230.

When any one of the absolute values |iu|, |iv|, and |iw| is larger than the limiting current A at S210, a negative determination is made and the processing proceeds to S230.

After the processing proceeds to S230, the switching elements SW4 to SW6 are turned off with the switching elements SW1 to SW3 off.

Concurrently with turning-off of the switching element SW4, at this time, a current based on magnetic energy flows from the W-phase coil 1c to the capacitor 30 through the diode D1 and the positive pole bus 22. That is, the current flows from the W-phase coil 1c to the capacitor 30 with the switching element SW1 bypassed.

Concurrently with turning-off of the switching element SW5, a current based on magnetic energy flows from the V-phase coil 1b to the capacitor 30 through the diode D2 and the positive pole bus 22. That is, the current flows from the V-phase coil 1b to the capacitor 30 with the switching element SW2 bypassed.

Concurrently with turning-off of the switching element SW6, a current based on magnetic energy flows from the U-phase coil 1a to the capacitor 30 through the diode D3 and the positive pole bus 22. That is, the current flows from the U-phase coil 1a to the capacitor 30 with the switching element SW3 bypassed.

The currents flow from the coils 1a, 1b, 1c to the capacitor 30 and electric charge is stored in the capacitor 30 due to the currents. That is, the capacitor 30 is charged by the switching operation of the switching elements SW4 to SW6.

In this embodiment, the switching elements SW1 to SW3 correspond to switching elements on the side of the remaining bus. The diodes D1 to D3 correspond to the diodes disposed in inverse parallel with the switching elements on the side of the remaining bus.

At S240, subsequently, it is checked whether or not a predetermined time (predetermined off-time Toff) or a longer time has passed after the switching elements SW4 to SW6 were turned off. The predetermined off-time (indicated as predetermined Toff in FIG. 4) is determined beforehand.

When the time that has passed after the switching elements SW4 to SW6 were turned off is shorter than the predetermined off-time Toff, a negative determination is made at S240 and the check processing of S240 is repeated. When the predetermined off-time Toff or a longer time has passed after the switching elements SW4 to SW6 were turned off, an affirmative determination is made at S240.

At S250, subsequently, it is checked whether or not the output voltage Vc of the capacitor 30 is equal to or higher than a target voltage value Vt. Specifically, it is checked whether or not a certain period of time or a longer time has passed after the execution of control by the initial state control unit 53 has been started.

When the time that has passed after the execution of control by the initial state control unit 53 has been started is shorter than the certain period of time, the output voltage Vc of the capacitor 30 is considered to be lower than the target voltage value Vt. Therefore, a negative determination is made at S250 and the processing returns to S200.

For this reason, the processing of each of S210, S220, S230, and S240 is repeated until the certain period of time or a longer time has passed after the execution of control by the initial state control unit 53 has been started. Therefore, the capacitor 30 is charged by the switching operation of the switching elements SW4 to SW6. As a result, the output voltage Vc of the capacitor 30 gradually rises as indicated by plotted curve (a) in FIG. 2.

When the certain period of time or a longer time has passed after the execution of control by the initial state control unit 53 has been started, the output voltage Vc of the capacitor 30 is considered to be equal to or higher than the target voltage value Vt. Therefore, an affirmative determination is made at S250. That is, the control of the state of charge of the capacitor 30 is determined to have been completed and the control by the initial state control unit 53 is terminated.

(Synchronization Control Unit 54)

Figure 5:
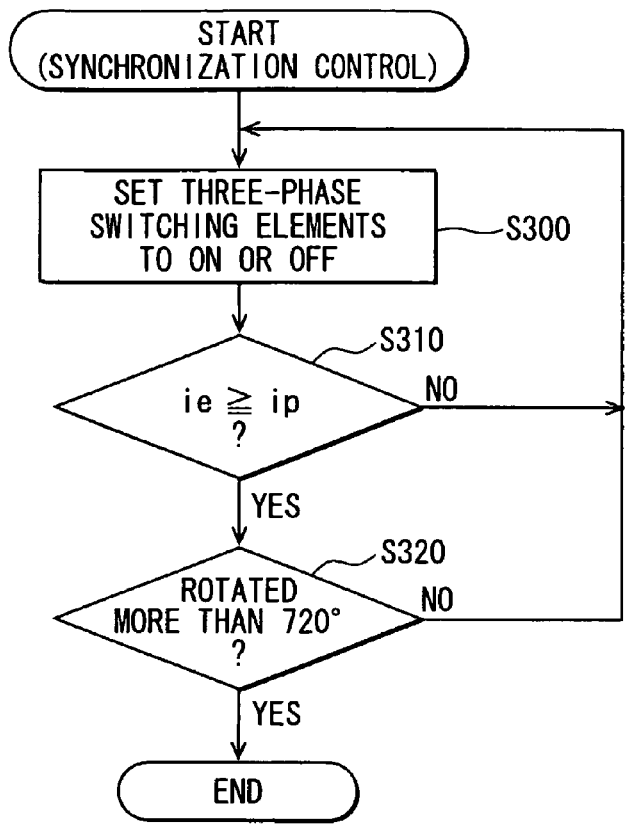
FIG. 5 is a flowchart illustrating control processing executed by a synchronization control unit in FIG. 1.

The synchronization control unit 54 carries out control processing in accordance with the flowchart illustrated in FIG. 5.

At S300, first, the switching outputs of the switching elements SW1 TO SW6 are set so that three-phase alternating currents are outputted to the stator coil 1 by a known triangular wave comparison PWM method.

That is, ON or OFF is set on each of the switching elements SW1, SW2, SW6 so that three-phase alternating currents are outputted to the stator coil 1.

This three-phase alternating current is a current whose effective value ie increased from an initial value by a predetermined value every half cycle (electrical angle of 180 degrees). The initial value of effective value ie is set to such a value that rotary torque produced at the rotor based on a rotating magnetic field is sufficiently smaller than torque produced on the load side of the three-phase alternating current synchronous motor.

At S300, subsequently, the effective value ie of three-phase alternating current is determined and it is checked whether or not this effective value ie of three-phase alternating current is equal to or larger than a predetermined value ip. When the effective value ie of three-phase alternating current is smaller than the predetermined value ip, a negative determination is made at S300 and the processing returns to S300.

Thereafter, the processing of S300 is repeated until the effective value ie of three-phase alternating current becomes equal to or higher than the predetermined value ip. Concurrently therewith, the switching elements SW1 to SW3 on the positive pole bus 22 side and the switching elements SW4 to SW6 on the negative pole bus 21 side are caused to perform switching operation.

For this reason, the three-phase alternating current is outputted from the following points to the stator coil 1 based on the output voltage Vc of the capacitor 30 and the output voltage of the high-voltage battery 3: the common connection point between the switching elements SW1, SW4; the common connection point between the switching elements SW2, SW5; and the common connection point between the switching elements SW3, SW6.

Consequently, a rotating magnetic field is produced from the stator coil 1. As a result, the rotor is rotated in synchronization with the rotating magnetic field.

Concurrently with turning-off of the switching elements SW4 to SW6 on the negative pole bus 21 side, electric charge is stored in the capacitor 30 as in the case of control by the initial state control unit 53.

In this embodiment, the following ratios are so set that the output voltage Vc of the capacitor 30 is kept at the target voltage value Vt, as described later: the ratio of on-time to off-time (positive side ratio H1) of the switching elements SW1 to SW3 on the positive pole bus 22 side for a certain period of time; and the ratio of on-time to off-time (negative side ratio H2) of the switching elements SW4 to SW6 on the negative pole bus 21 side for a certain period of time.

When the effective value ie of three-phase alternating current thereafter becomes equal to or larger than the predetermined value ip, an affirmative determination is made at S310 and the processing proceeds to S320. At S320, it is checked whether or not a three-phase alternating current equivalent to an electrical angle of 720 degrees or more has been outputted to the stator coil 1 since the following processing was carried out: since the switching outputs of the switching elements SW1 to SW6 were initially set at S300.

When the three-phase alternating current outputted to the stator coil 1 is equivalent to less than an electrical angle of 720 degrees, a negative determination is made at S320 and the processing returns to S300. For this reason, the processing of S300 and the check processing of S310 are repeated as long as a negative determination is made at S320.

Therefore, three-phase alternating current whose effective value is increased every half cycle as indicated by plotted curve (b) in FIG. 2 is outputted to the stator coil 1. In FIG. 2, only the plotted curve for u-phase current iu is indicated.

When the three-phase alternating current outputted to the stator coil 1 since the switching outputs of the switching elements SW1 to SW6 were initially set at S300 becomes equivalent to an electrical angle 720 degrees or more, the following processing is carried out: an affirmative determination is made at S320 and then the control by the synchronization control unit 54 is terminated.

The positive side ratio H1 and the negative side ratio H2 are described further in detail.

When the switching elements SW1 to SW3 on the positive pole bus 22 side are ON, current flows from the capacitor 30 to the switching elements SW1 to SW3. Therefore, the electric charge stored in the capacitor 30 is reduced as a result.

When the switching elements SW4 to SW6 on the negative pole bus 21 side are ON, the magnetic energy of the coils 1a, 1b, 1c is stored. When the switching elements SW1 to SW6 are OFF, electric charge is stored in the capacitor 30 based on the magnetic energy of the coils 1a, 1b, 1c.

Therefore, in conjunction with the switching operation of the switching elements SW1 to SW6, electric charge is repeatedly stored in and discharged from the capacitor 30.

The amount of electric charge discharged from the capacitor 30 is determined by the on-time of the switching elements SW1 to SW3 on the positive pole bus 22 side.

The amount of electric charge stored in the capacitor 30 is determined by the on-time of the switching elements SW4 to SW6 on the negative pole bus 21 side and the off-time of the switching elements SW1 to SW6.

Consequently, the positive side ratio H1 and negative side ratio H2 in this embodiment are so set that the following is implemented: the amount of electric charge discharged from the capacitor 30 for a certain period of time and the amount of electric charge stored in the capacitor 30 for the same period of time are equalized with each other.

Thus the synchronization control unit 54 can keep the output voltage Vc of the capacitor 30 at the target voltage value Vt by causing the switching elements SW1 to SW6 to perform switching operation.

(Forced Commutation Control Unit 55)

The forced commutation control unit 55 carries out control to increase the angular velocity ω of a rotating magnetic field to a certain angular velocity ωd.

Specifically, the forced commutation control unit 55 carries out the following processing so that three-phase alternating current is outputted to the stator coil 1: the switching elements SW1 to SW3 on the positive pole bus 22 side and the switching elements SW4 to SW6 on the negative pole bus 21 side are caused to perform switching operation.

At this time, the forced commutation control unit 55 causes the switching elements SW1 to SW6 to perform switching operation and thereby implements the following: the angular velocity ω of three-phase alternating current is gradually increased more than in the case of control by the synchronization control unit 54. Specifically, the angular velocity ω of three-phase alternating current is increased every half cycle to the certain angular velocity ωd.

As a result, the rotor is rotated in synchronization with a rotating magnetic field produced by the stator coil 1. At this time, the rotating magnetic field produced by the stator coil 1 is gradually accelerated. Therefore, the rotational speed of the rotor is gradually increased to a certain speed Sd.

When the switching elements SW4 to SW6 on the negative pole bus 21 side perform switching operation, the following takes place: concurrently with turning-off of the switching elements SW4 to SW6 on the negative pole bus 21 side, electric charge is stored in the capacitor 30 as in the case of control by the initial state control unit 53.

(Normal Operation Control Unit 56)

The normal operation control unit 56 causes each of the switching elements SW1 to SW6 of the inverter circuit 20 to perform switching operation to output three-phase alternating current to the stator coil 1.

The normal operation control unit 56 maintains a state in which the angular velocity ω of three-phase alternating current is equal to or higher than the certain angular velocity ωd. At the same time, it causes the switching elements SW1 to SW3 on the positive pole bus 22 side and the switching elements SW4 to SW6 on the negative pole bus 21 side to perform switching operation so that the following is implemented: the angular velocity ωz of three-phase alternating current is brought close to a target angular velocity commanded from the electronic controller 7.

Specifically, the normal operation control unit 56 determines timing at which the detection currents iu, iv, iw of the current sensor 40 are zeroed. It then estimates the position of the rotor based on this timing and estimates the angular velocity ωs of the rotor based on the estimated rotor position.

Further, the normal operation control unit 56 causes each of the switching elements SW1 to SW6 to perform switching operation so that the following is implemented: the estimated angular velocity ωs is brought close to a target angular velocity ωm commanded from the electronic controller 7.

Thus the angular velocity ω of the rotating magnetic field produced by the stator coil 1 is brought close to the target angular velocity ωm. For this reason, the angular velocity of the rotor is brought close to the target angular velocity ωm. Consequently, the speed of the rotor of the three-phase alternating current synchronous motor can be controlled.

When the switching elements SW4 to SW6 on the negative pole bus 21 side are turned off, electric charge is stored in the capacitor 30 as in the case of control by the initial state control unit 53.

According to this embodiment described above, the initial state control unit 53 stores electric charge in the capacitor 30 prior to the execution of control by the normal operation control unit 56. The state of charge of the capacitor 30 can be thereby controlled. For this reason, passage of large current through the capacitor immediately after the start of execution of control by the normal operation control unit 56 can be suppressed. As a result, the operating state of the three-phase alternating current synchronous motor does not become unstable and the execution of control by the normal operation control unit 56 can be started with the output voltage of the capacitor 30 stable. For this reason, the speed of the three-phase alternating current synchronous motor can be accurately controlled.

When any one of |iu|, |iv|, and |iw| is larger than the limiting current A at S210, the normal operation control unit 56 turns off the switching elements SW4 to SW6. For this reason, passage of large current through the capacitor 30 can be suppressed. Therefore, the output voltage of the capacitor can be kept stable.

In this embodiment, the electronic controller 7 stands by for a certain period of time after the switch element 5b has been closed before commanding the driving device 10 to start control. Though the output voltage of the capacitor 30 fluctuates with the closing of the switch element 5b, for this reason, the following can be implemented: after the voltage fluctuation ceases and the voltage is stabilized, control by the initial state control unit 53 of the driving device 10 can be started.

When the rotor is rotated in synchronization with the rotating magnetic field produced by the stator coil 1, the synchronization control unit 54 causes the switching elements SW4 to SW6 on the negative pole bus 21 side to perform switching operation. Therefore, electric charge can be stored in the capacitor 30 as described.

When the rotor is rotated in synchronization with the rotating magnetic field produced by the stator coil 1, the synchronization control unit 54 outputs the following three-phase alternating current to the stator coil 1: a three-phase alternating current whose effective value is increased from an initial value by a predetermined value every half cycle. For this reason, rotary torque based on the rotating magnetic field produced by the stator coil 1 is gradually increased with increase in the effective value of three-phase alternating current. Consequently, the rotor can be rotated without causing vibration in the rotor.

The initial value of the effective value of three-phase alternating current is set to the following value as described above: a value with which rotary torque produced at the rotor based on the rotating magnetic field is sufficiently smaller than torque produced on the load side of the three-phase alternating current synchronous motor. For this reason, vibration is less prone to be caused in the rotor.

The forced commutation control unit 55 increases the angular velocity ω of the rotating magnetic field to the certain angular velocity and for the following reasons.

To estimate the angular velocity ωs of the rotor, the normal operation control unit 56 determines each time T(1), T(2), . . . , T(n), T(n+1), . . . , T(m) when the detection current of the current sensor 40 is zeroed.

For this reason, if the period, for example, between the n-th time T(n) and the (n+1)-th time T(n+1) is long, a delay is produced when the angular velocity ω of the rotor is controlled. Therefore, the speed of the rotor of the three-phase alternating current synchronous motor cannot be favorably controlled.

Therefore, the normal operation control unit 56 can ensure the accuracy of rotor speed control by taking the following measure: maintaining a state in which the angular velocity ω of the rotating magnetic field is equal to or higher than a certain angular velocity ωd and controlling the number of rotations of the rotor.

In the first embodiment, the following case has been taken as an example: a case where the synchronization control unit 54 outputs three-phase alternating current equivalent to an electrical angle of 720 degrees or more from the inverter circuit 20 to the stator coil 1. However, the invention is not limited to this and three-phase alternating current equivalent to any electrical angle may be outputted to the stator coil 1 as long as the current is equivalent to an electrical angle of 90 degrees or more.

It is recommended that three-phase alternating current equivalent to an integral multiple of an electrical angle of 360 degrees should be outputted from the inverter circuit 20 to the stator coil 1. This is intended to avoid the termination of control by the synchronization control unit 54 with the capacitor 30 deviated from the target voltage.

In the first embodiment, the following case has been taken as an example: a case where the synchronization control unit 54 outputs three-phase alternating current whose effective value is gradually increased by a predetermined value by the stator coil 1. However, the invention is not limited to this and the synchronization control unit 54 may output three-phase alternating current whose effective value is constant by the stator coil 1.

In the first embodiment, the following case has been taken as an example: the synchronization control unit 54 causes the switching elements SW1 to SW3 on the positive pole bus 22 side and the switching elements SW4 to SW6 on the negative pole bus 21 side to perform switching operation to output alternating current to the stator coil 1. However, the invention is not limited to this and the synchronization control unit 54 may carry out the following processing to output alternating current to the stator coil 1: the switching elements SW4 to SW6 on the negative pole bus 21 side are caused to perform switching operation with the switching elements SW1 to SW3 on the positive pole bus 22 side off.

Figure 6A:
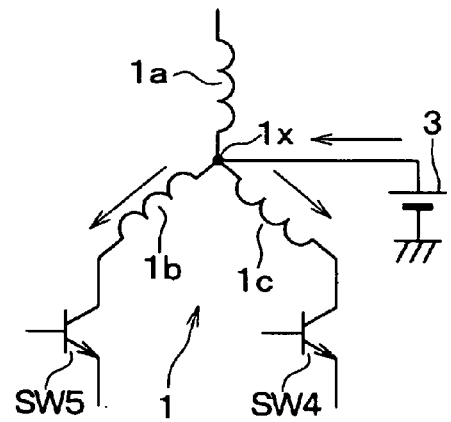
FIGS. 6A to 6C are diagrams illustrating control processing by the synchronization control unit in a modification to the first embodiment.

As illustrated in FIG. 6A, first, the switching elements SW4, SW5 are turned on. For this reason, current flows from the high-voltage battery 3 to the V-phase coil 1b and the W-phase coil 1c. At this time, a combined magnetic field of a magnetic field produced by the V-phase coil 1b and a magnetic field produced by the W-phase coil 1c is produced.

Figure 6B:
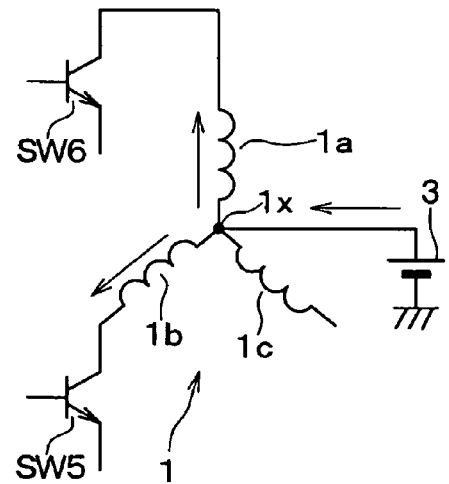

Subsequently, the switching element SW4 is turned off and the switching elements SW5, SW6 are turned on as illustrated in FIG. 6B. For this reason, current flows from the high-voltage battery 3 to the V-phase coil 1b and the U-phase coil 1a. At this time, a combined magnetic field of a magnetic field produced by the V-phase coil 1b and a magnetic field produced by the U-phase coil 1a is produced.

Figure 6C:
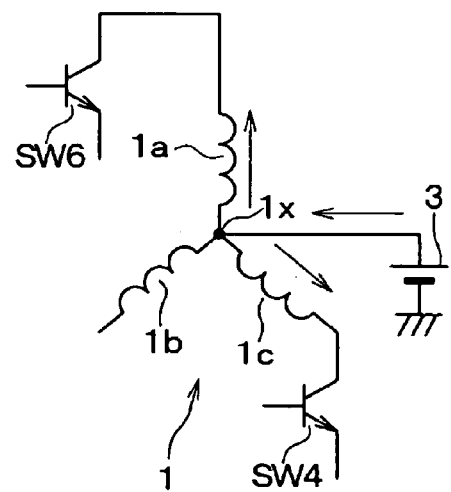

Thereafter, the switching element SW5 is turned off and the switching elements SW4, SW6 are turned on as illustrated in FIG. 6C. For this reason, current flows from the high-voltage battery 3 to the W-phase coil 1c and the U-phase coil 1a. At this time, a combined magnetic field of a magnetic field produced by the W-phase coil 1c and a magnetic field produced by the U-phase coil 1a is produced.

Thereafter, the switching elements SW4, SW5 are turned on again as illustrated in FIG. 6A.

As described above, the two switching elements turned on are changed in the order of the switching elements SW4, SW5 to the switching elements SW5, SW6 to the switching elements SW4, SW6 to the switching elements SW4, SW5.

At this time, the combined magnetic field is rotated clockwise as the two switching elements turned on are changed. As a result, the rotor is rotated clockwise in synchronization with the combined magnetic field.

In the first embodiment, the following case has been taken as an example: a case where the initial state control unit 53 carries out control until the output voltage of the capacitor 30 is determined to have reached a target voltage value. Instead, a temperature sensor 31 for detecting the temperature of the capacitor 30 may be used. In this case, the initial state control unit 53 carries out control until the output voltage of the capacitor 30 reaches the target voltage value and the temperature of the capacitor 30 is determined to be at a predetermined value or more.

In cases where an electrolytic capacitor is used for the capacitor 30, for example, the internal resistance of the capacitor 30 is reduced to a very low value when the temperature of the capacitor 30 is very low. For this reason, if control by the normal operation control unit 56 is carried out when the temperature of the capacitor 30 is very low, there is a possibility that a large current will be passed through the capacitor 30.

In the above example, meanwhile, the initial state control unit 53 carries out control until the output voltage of the capacitor 30 reaches a certain voltage value and the temperature of the capacitor 30 is determined to be at a predetermined value or more. Thus a passage of large current through the capacitor 30 when control by the normal operation control unit 56 is carried out can be suppressed even though an electrolytic capacitor is used for the capacitor 30.

The temperature of the capacitor 30 may be estimated using a time for which control by the initial state control unit 53 is carried out or the like without use of the temperature sensor 31.

In the first embodiment, the following case has been taken as an example: a case where the positive electrode of the capacitor 30 is connected to the positive pole bus 22 and the negative electrode of the capacitor 30 is connected to the neutral point 1x of the stator coil 1. However, the invention is not limited to this and the measure illustrated in FIG. 7 may be taken. That is, the positive electrode of the capacitor 30 may be connected to the positive pole bus 22 with the negative electrode of the capacitor 30 connected to the negative pole bus 21.

In the first embodiment, the following case has been taken as an example: a case where the positive electrode of the high-voltage battery 3 is connected to the neutral point 1x of the stator coil 1 and the negative electrode of the high-voltage battery 3 is connected to the negative pole bus 21. Instead, the measure illustrated in FIG. 8 and FIG. 9 may be taken. That is, the positive electrode of the high-voltage battery 3 may be connected to the positive pole bus 22 with the negative electrode of the high-voltage battery 3 connected to the neutral point 1x of the stator coil 1.

Figure 8:
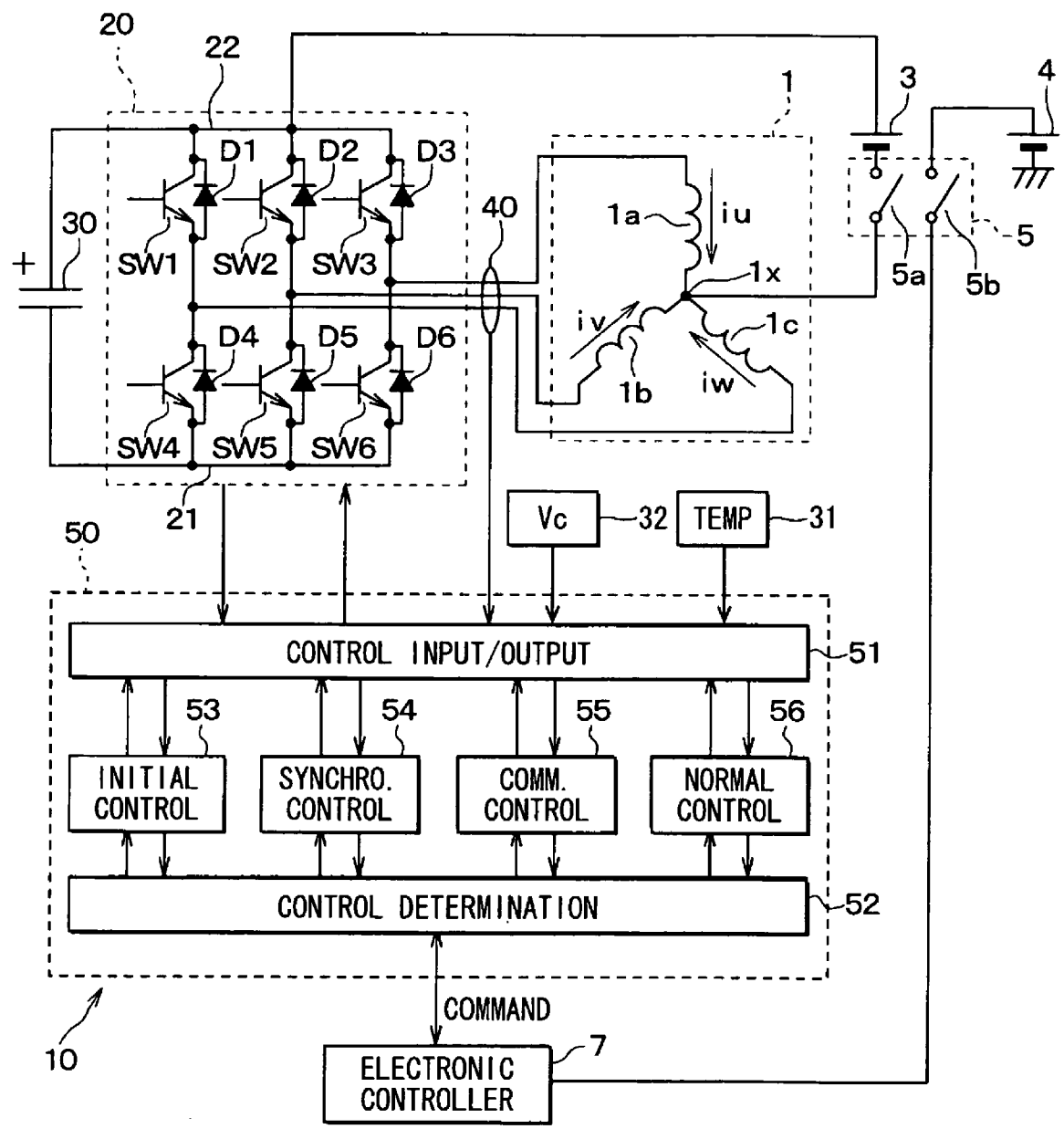
FIG. 8 is a circuit diagram illustrating a driving device for three-phase alternating current synchronous motors in a modification to the first embodiment of the invention.
Figure 9:
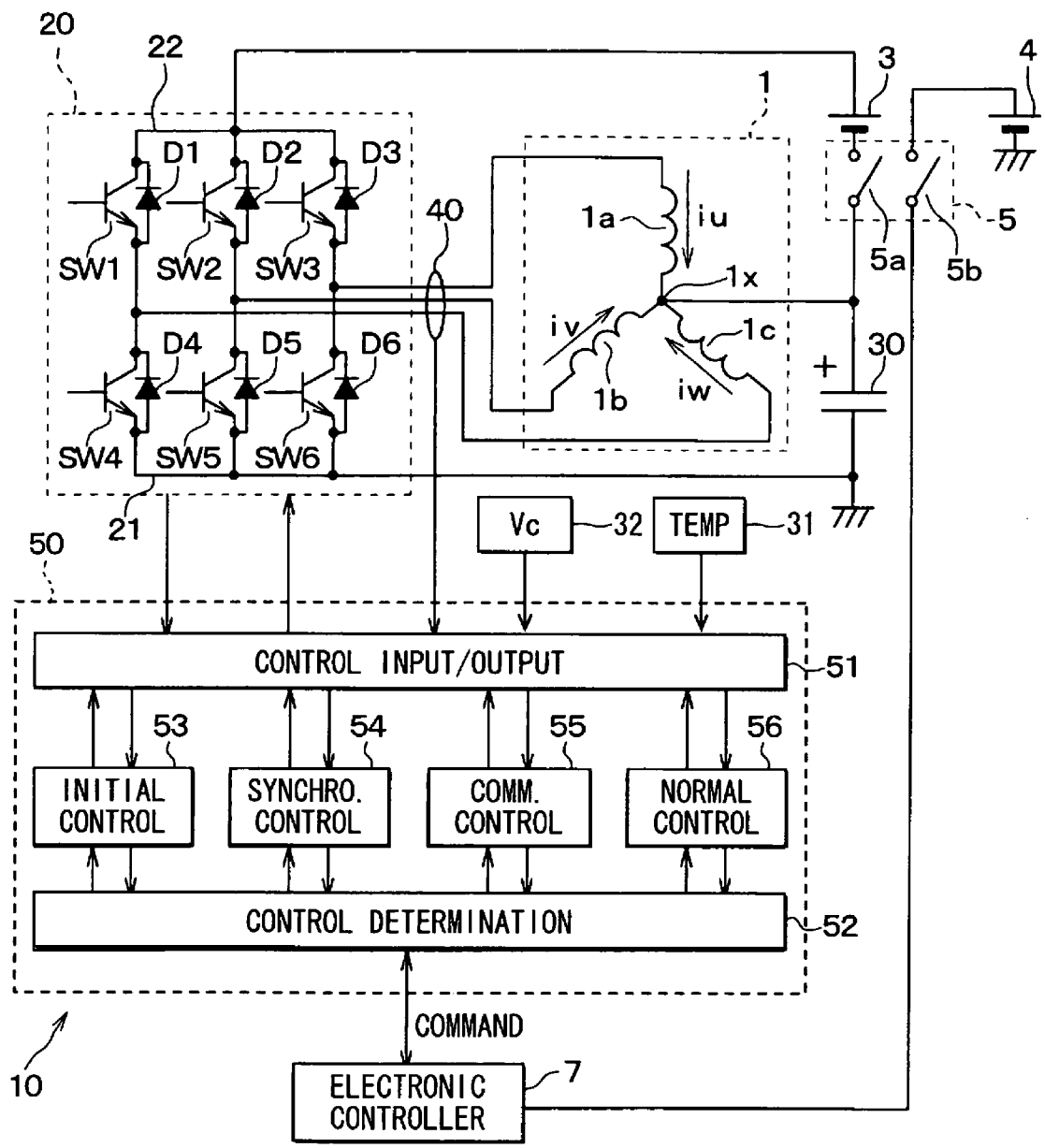
FIG. 9 is a circuit diagram illustrating a driving device for three-phase alternating current synchronous motors in a modification to the first embodiment of the invention.

In this case, the positive electrode of the capacitor 30 may be connected to the positive pole bus 22 with the negative electrode of the capacitor 30 connected to the negative pole bus 21 as illustrated in FIG. 8. Alternatively, the positive electrode of the capacitor 30 may be connected to the neutral point 1x of the stator coil 1 with the negative electrode of the capacitor 30 connected to the negative pole bus 21 as illustrated in FIG. 9.

In the driving device 10 in which the high-voltage battery 3 is connected between the positive pole bus 22 and the neutral point 1x of the stator coil 1 as described above, the following takes place: the processing of controlling the switching elements SW1, SW2, . . . , SW6 to charge the capacitor 30 is different from the first embodiment. However, processing by each of the control units 53, 54, 55, 56 other than the above processing is substantially the same as in the first embodiment.

The processing for charging the capacitor 30 in the driving device 10, in which the high-voltage battery 3 is connected between the positive pole bus 22 and the neutral point 1x of the stator coil 1, is described below.

In this case, in place of the switching elements on the negative pole bus 21 side, the switching elements on the positive pole bus 22 side are caused to perform switching operation.

For example, of the switching elements SW1 to SW3 on the positive pole bus 22 side, the switching element SW1 is turned on with the switching elements SW4 to SW6 on the negative pole bus 21 side off. Thus current flows from the positive electrode of the high-voltage battery 3 to the negative electrode of the high-voltage battery 3 through the W-phase coil 1c. As a result, magnetic energy is stored in the W-phase coil 1c.

When the switching element SW1 is thereafter turned off, current based on the magnetic energy stored in the W-phase coil 1c flows from the negative electrode of the capacitor 30 to the W-phase coil 1c through the diode D4. That is, concurrently with turning-off of the switching element SW1, electric charge is stored in the capacitor 30 by current flowing from the negative electrode of the capacitor 30 to the W-phase coil 1c with the switching element SW4 bypassed.

As described above, the capacitor 30 can be charged by storing electric charge in the capacitor 30 based on the magnetic energy stored in the W-phase coil 1c by taking the following measure: the switching element SW1 on the positive pole bus 22 side is caused to perform switching operation.

In the case of the driving device 10, in which the high-voltage battery 3 is connected between the positive pole bus 22 and the neutral point 1x of the stator coil 1, the following takes place: the switching elements SW1 to SW3 correspond to switching elements on the side of a bus to which either of the positive electrode and the negative electrode of the power supply device (3) is connected; and the switching elements SW4 to SW6 correspond to switching elements on the side of the remaining bus.

Second Embodiment

In the first embodiment, the following case has been taken as an example: a case where the rotor is synchronized with a rotating magnetic field produced by the stator coil by the synchronization control unit prior to control by the forced commutation control unit. In the second embodiment, instead, the rotor is positioned by a magnetic field produced by the stator coil prior to control by the forced commutation control unit.

Figure 10:
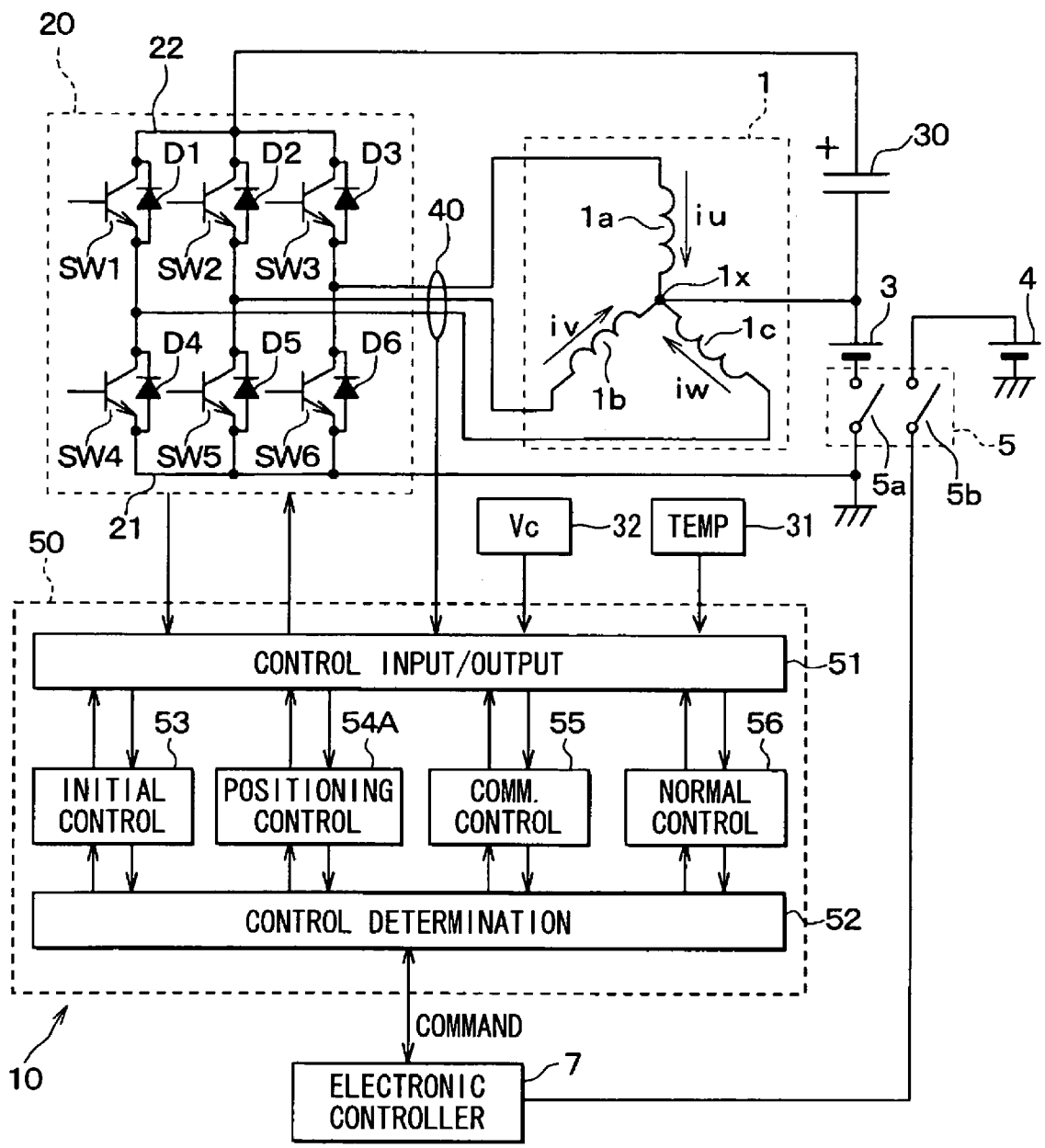
FIG. 10 is a circuit diagram illustrating a driving device for three-phase alternating current synchronous motors in a second embodiment of the invention.

As illustrated in FIG. 10, the driving device 10 has a positioning control unit 54A in place of the synchronization control unit 54 in the first embodiment (FIG. 1).

Figure 11:
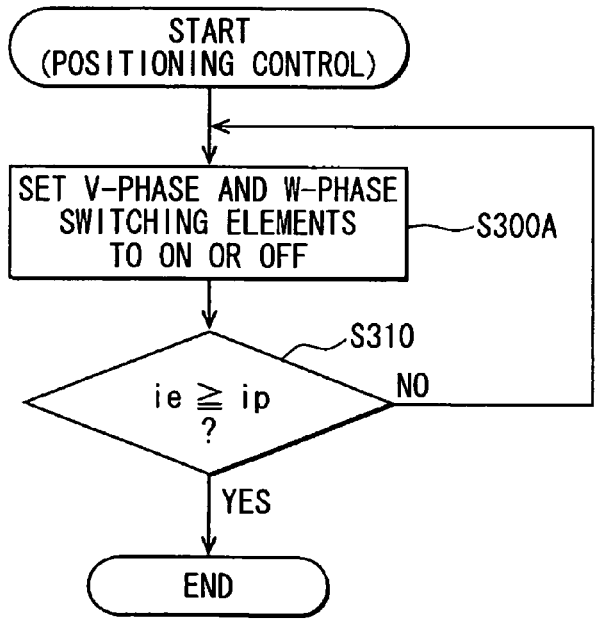
FIG. 11 is a flowchart illustrating control processing executed by a positioning control unit in the second embodiment.

The control processing carried out by the positioning control unit 54A is described in detail with reference to FIG. 11.

At S300A, first, the switching outputs of the switching elements SW4, SW5 are set so as to output current to the V-phase coil 1b and the W-phase coil 1c of the stator coil 1. That is, the switching elements SW4, SW5 are turned on or off so as to output current to the stator coil 1.

This current flows from the positive electrode of the high-voltage battery 3 to the neutral point 1x to the V-phase coil 1b to the switching element SW5. Further, the current flows from the neutral point 1x to the switching element SW4 by way of the W-phase coil 1c.

In addition, the current is a current whose effective value ie is increased from an initial value by a predetermined value every half cycle (electrical angle of 180 degrees). The initial value of effective value ie is set to such a value that rotary torque produced at the rotor based on a magnetic field is sufficiently smaller than torque produced on the load side of the three-phase alternating current synchronous motor.

At S310, subsequently, it is checked whether or not the effective value ie of the current is equal to or larger than a predetermined value ip. When the effective value ie of the alternating current is smaller than the predetermined value ip, a negative determination is made at S310 and the processing returns to S300A.

Thereafter, the processing of S300A is repeated until the effective value ie of the alternating current becomes equal to or larger than the predetermined value ip. Concurrently therewith, the switching elements SW4, SW5 are caused to perform switching operation.

For this reason, current is passed through the V-phase coil 1b and the W-phase coil 1c of the stator coil 1. Consequently, a magnetic field is produced at the V-phase coil 1b and the W-phase coil 1c of the stator coil 1. Therefore, the rotor is attracted to the magnetic fields produced at the V-phase coil 1b and the W-phase coil 1c. As a result, the position of the rotor is determined.

Concurrently with turning-off of the switching elements SW4, SW5 on the negative pole bus 21 side, electric charge is stored in the capacitor 30 as in the case of control by the initial state control unit 53.

In this embodiment, the following ratios are so set that the output voltage Vc of the capacitor 30 is kept at the target voltage value Vt as in the first embodiment: the positive side ratio H1 of the switching element SW3 on the positive pole bus 22 side for a certain period of time; and the negative side ratio H2 of the switching elements SW4, SW5 on the negative pole bus 21 side for the same period of time.

When the effective value ie of alternating current thereafter becomes equal to or larger than the predetermined value ip, an affirmative determination is made at S310 and control by the positioning control unit 54A is terminated.

According to this embodiment, the positioning control unit 54A carries out the following processing when the rotor position is determined by the magnetic fields produced by the V-phase coil 1b and W-phase coil 1c of the stator coil 1: the switching elements SW4, SW5 on the negative pole bus 21 side are caused to perform switching operation. Therefore, electric charge can be stored in the capacitor 30 as described above.

The positioning control unit 54A in this embodiment carries out the following processing when a magnetic field is produced at the V-phase coil 1b and the W-phase coil 1c of the stator coil 1: current whose effective value ie is gradually increased is outputted to the V-phase coil 1c and the W-phase coil 1c. For this reason, torque for attracting the rotor in the direction in which the magnetic fields are produced is gradually increased. In addition, the initial value of effective value is set to such a value that rotary torque produced at the rotor based on the magnetic fields is sufficiently smaller than torque produced on the load side of the three-phase alternating current synchronous motor. Therefore, the position of the rotor can be determined without causing vibration in the rotor.

In the second embodiment, the following case has been taken as an example: a case where the rotor is positioned by attracting the rotor to the magnetic fields produced by passing current through the V-phase coil 1b and the W-phase coil 1c. However, the invention is not limited to this and the rotor may be positioned by passing current through any other phase.

In the second embodiment, the following case has been taken as an example: a case where the positive electrode of the capacitor 30 is connected to the positive pole bus 22 and the negative electrode of the capacitor 30 is connected to the neutral point 1x of the stator coil 1. However, the invention is not limited to this and the positive electrode of the capacitor 30 may be connected to the positive pole bus 22 with the negative electrode of the capacitor 30 connected to the negative pole bus 21.

In the second embodiment, the following case has been taken as an example: a case where the positive electrode of the high-voltage battery 3 is connected to the neutral point 1x of the stator coil 1 and the negative electrode of the high-voltage battery 3 is connected to the negative pole bus 21. Instead, the positive electrode of the high-voltage battery 3 may be connected to the positive pole bus 22 with the negative electrode of the high-voltage battery 3 connected to the neutral point 1x of the stator coil 1.

In this case, the positive electrode of the capacitor 30 may be connected to the positive pole bus 22 with the negative electrode of the capacitor 30 connected to the negative pole bus 21. Alternatively, the positive electrode of the capacitor 30 may be connected to the neutral point 1x of the stator coil 1 with the negative electrode of the capacitor 30 connected to the negative pole bus 21.

In the driving device 10 in which the high-voltage battery 3 is connected between the positive pole bus 22 and the neutral point 1x of the stator coil 1 as described above, the following takes place: the processing of controlling the switching elements SW1, SW2, . . . , SW6 to charge the capacitor 30 is different from the second embodiment. However, processing by each of the control units 53, 54A, 55, 56 other than the above processing is substantially the same as in the second embodiment.

Third Embodiment

In the second embodiment, the following case has been taken as an example: a case where the initial state control unit 53 for controlling the state of charge of the capacitor 30 and the positioning control unit 54A for positioning the rotor are caused to carry out control prior to control by the forced commutation control unit 55. In the third embodiment, instead, an initial state and positioning control unit for controlling the state of charge of the capacitor and positioning the rotor is caused to carry out control.

Figure 7:
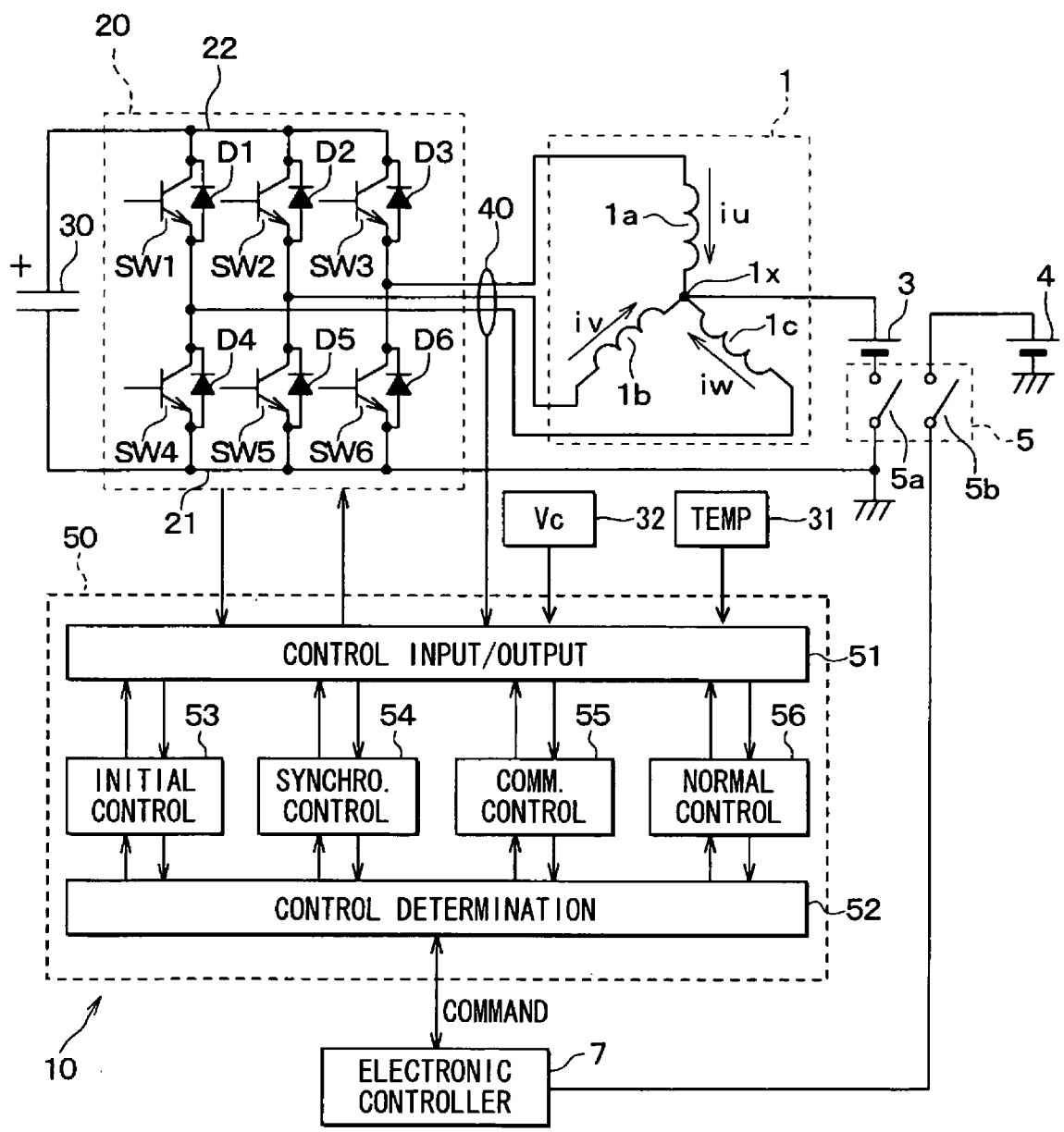
FIG. 7 is a circuit diagram illustrating a driving device for three-phase alternating current synchronous motors in a modification to the first embodiment of the invention.
Figure 12:
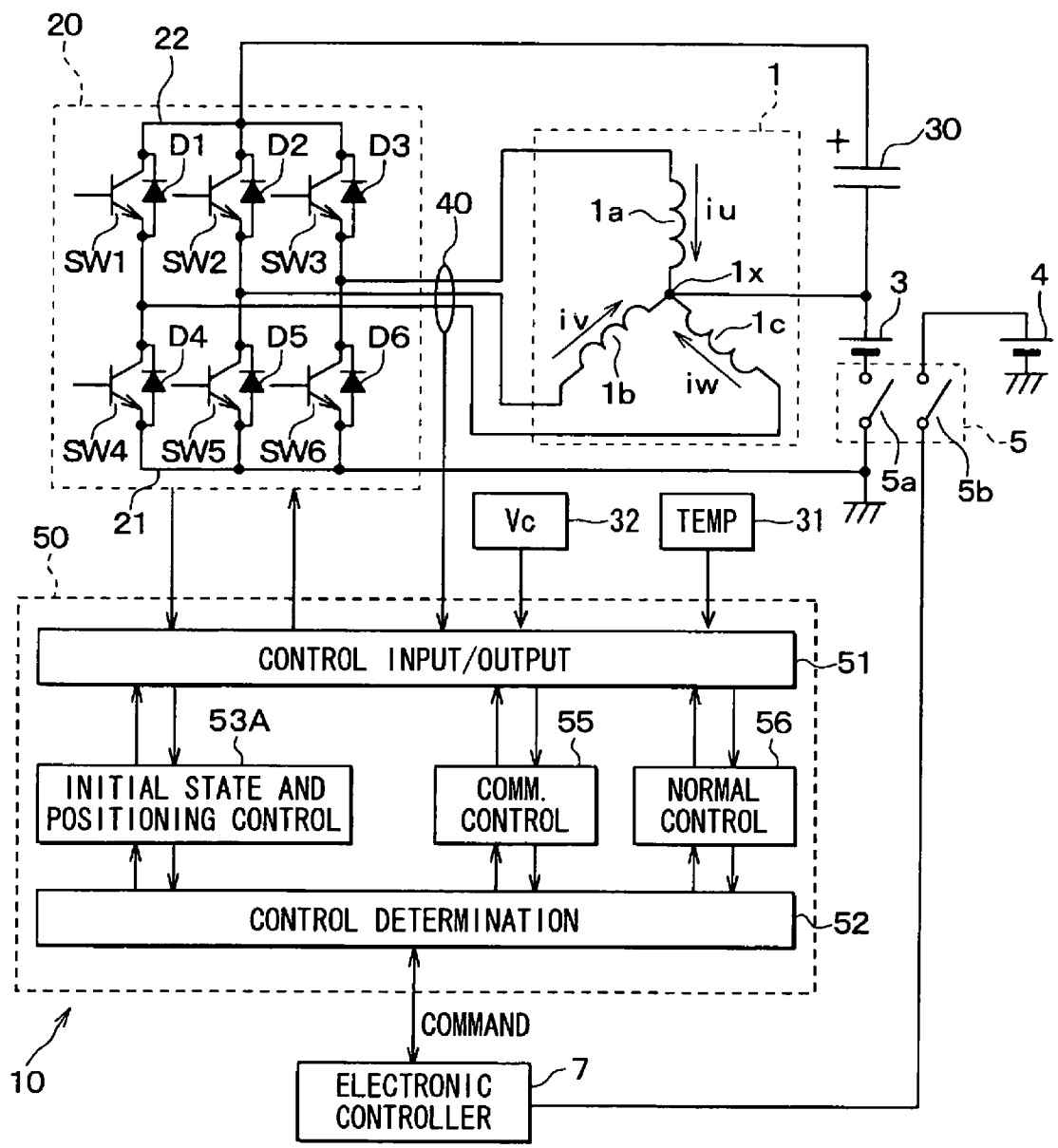
FIG. 12 is a circuit diagram illustrating a driving device for three-phase alternating current synchronous motors in a third embodiment of the invention.

In the driving device 10 in this embodiment, as illustrated in FIG. 12, an initial state and positioning control unit 53A is used in place of the initial state control unit 53 and the positioning control unit 54A in FIG. 7.

Figure 13:
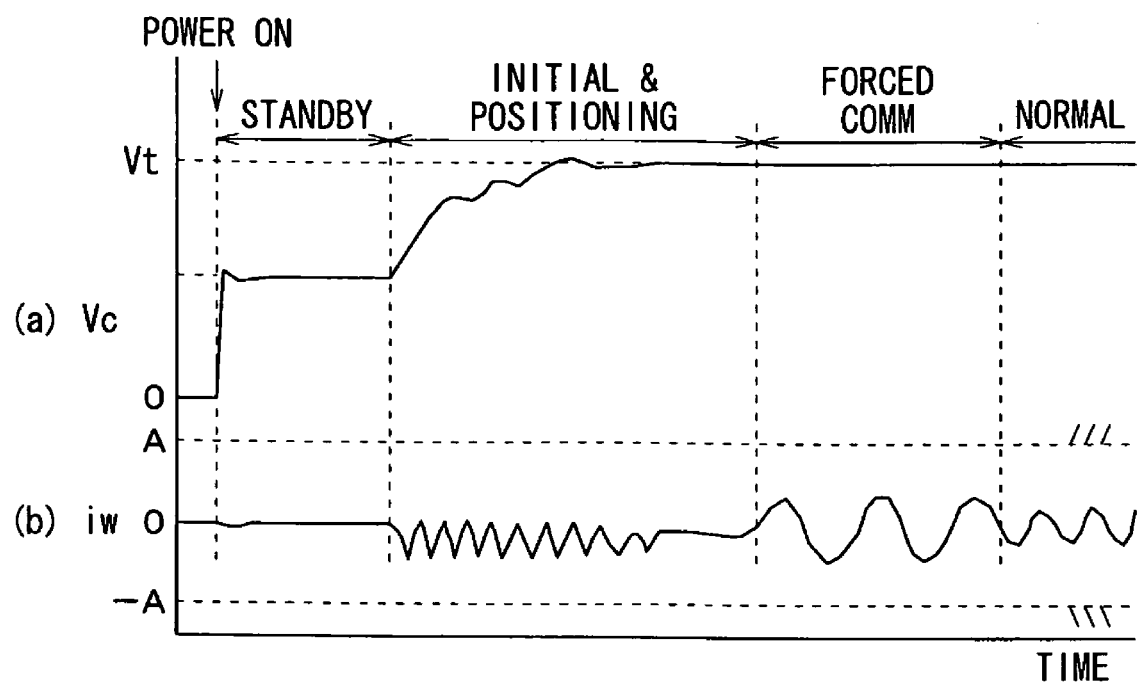
FIG. 13 is a timing chart indicating change in the output voltage of a capacitor and change in U-phase current in the third embodiment.

The control processing carried out by the initial state and positioning control unit 53A is described in detail with reference to FIG. 13 and FIG. 14. FIG. 13 is a timing chart, in which plotted curve (a) indicates change in the output voltage Vc of the capacitor 30 and plotted curve (b) indicates change in u-phase current iu.

Figure 14:
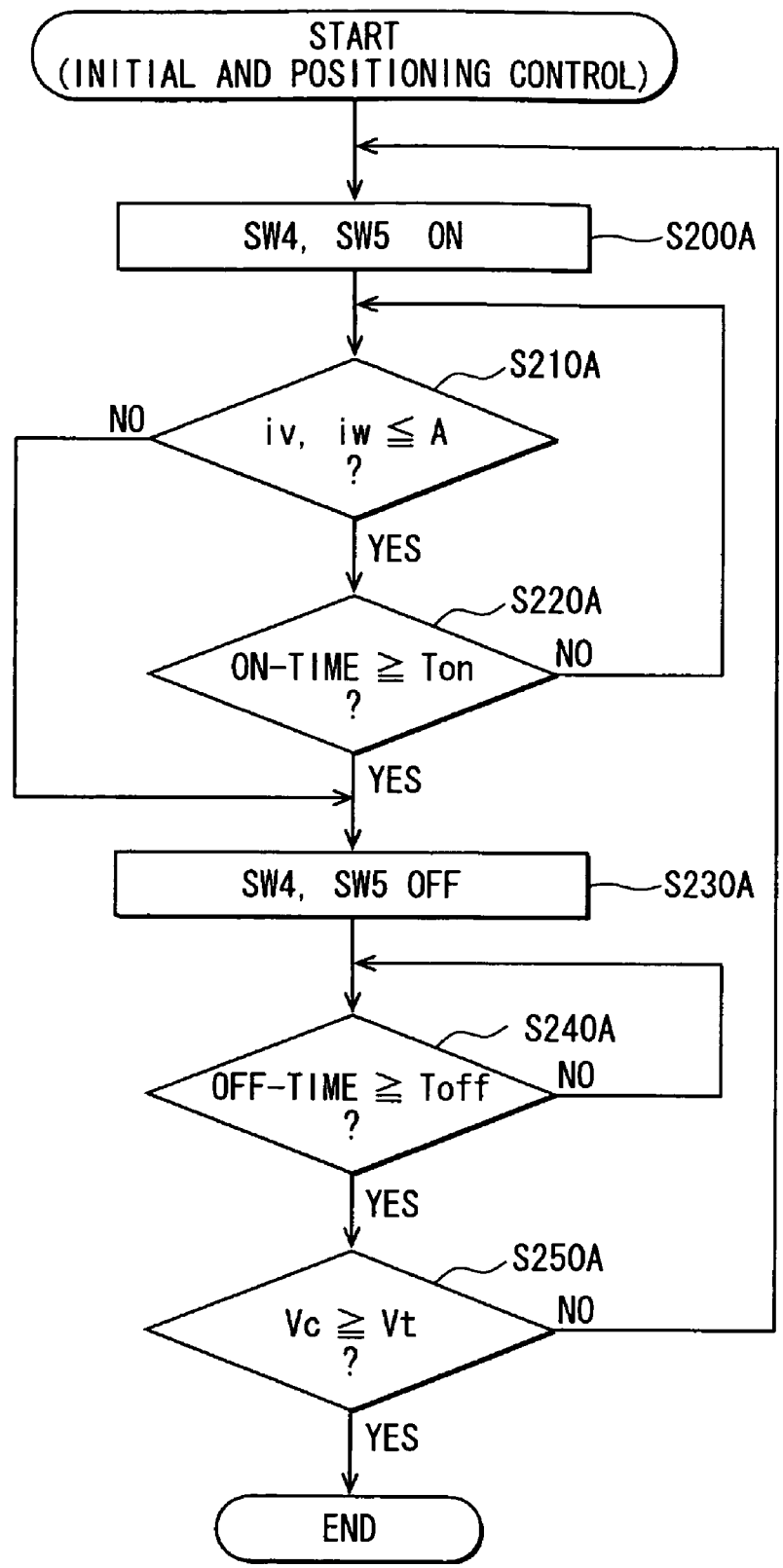
FIG. 14 is a flowchart illustrating control processing executed by an initial state and positioning control unit in the third embodiment.

The initial state and positioning control unit 53A carries out control processing in accordance with the flowchart in FIG. 14.

At S200A, first, the switching elements SW4, SW5 are turned on. As a result, current flows from the positive electrode of the high-voltage battery 3 to ground through the V-phase coil 1b and the W-phase coil 1c. For this reason, magnetic energy is stored in the V-phase coil 1b and the W-phase coil 1c based on the current.

At S210, subsequently, the following is determined based on phase currents iv, iw detected by the current sensor 40: whether or not the respective absolute values |iv|, |iw| of the phase currents iv, iw are equal to or smaller than the limiting current A. For the limiting current A, the same value as of the limiting current A described in relation to the first embodiment is used.

When all the absolute values |iv|, |iw| are equal to or smaller than the limiting current A, an affirmative determination is made at S210A.

At S220A, in this case, it is checked whether or not a predetermined time (Ton or a longer time has passed after each of the switching elements SW4, SW5 was turned on. This predetermined on-time (Ton) is determined beforehand.

When the time that has passed after the switching elements SW4, SW5 were turned on is shorter than the predetermined on-time Ton, a negative determination is made at S220A and then the check processing of S210A is repeated.

When the predetermined on-time Ton or a longer time has passed after the switching elements SW4, SW5 were turned on, an affirmative determination is made at S220A and the processing proceeds to S230A.

When any one of the absolute values |iv|, |iw| is larger than the limiting current A at S210A, a negative determination is made and the processing proceeds to S230A.

After the processing proceeds to S230A as described above, the switching elements SW4, SW5 are turned off with the switching elements SW1 to SW3 off.

Concurrently with turning-off of the switching element SW4, at this time, a current based on magnetic energy flows from the W-phase coil 1c to the capacitor 30 through the diode D1 and the positive pole bus 22.

As described above, concurrently with turning-off of the switching element SW5, a current based on magnetic energy flows from the V-phase coil 1b to the capacitor 30 through the diode D2 and the positive pole bus 22.

Electric charge is stored in the capacitor 30 by the currents flowing from the coils 1b, 1c with the switching elements SW4, SW5 bypassed.

At S240A, subsequently, it is checked whether or not a predetermined time (Toff) or a longer time has passed after the switching elements SW4, SW5 were turned off. The predetermined off-time (Toff) is determined beforehand.

When the time that has passed after the switching elements SW4, SW5 were turned off is shorter than the predetermined off-time Toff, a negative determination is made at S240A and the check processing of S240A is repeated. When the predetermined off-time Toff or a longer time has passed after the switching elements SW4, SW5 were turned off, an affirmative determination is made at S240A.

At S250A, subsequently, it is checked whether or not the output voltage Vc of the capacitor 30 is equal to or higher than a target voltage value Vt. Specifically, it is checked whether or not a certain period of time or a longer time has passed after the execution of control by the initial state and positioning control unit 53A has been started.

When the time that has passed after the execution of control by the initial state and positioning control unit 53A has been started is shorter than the certain period of time, the output voltage of the capacitor 30 is considered to be lower than the target voltage value. Therefore, a negative determination is made at S250A and the processing returns to S200A.

For this reason, the processing of each of S200A, S210A, S220A, S230A, and S240A is repeated until the certain period of time or a longer time has passed after the execution of control by the initial state and positioning control unit 53A has been started. Therefore, the capacitor 30 is charged by the switching operation of the switching elements SW4, SW5. As a result, the output voltage Vc of the capacitor 30 gradually rises as indicated by plotted curve (a) in FIG. 13.

In addition, with the switching operation of each of the switching elements SW4, SW5, current flows from the positive electrode of the high-voltage battery 3 to the V-phase coil 1b. As a result, a magnetic field is produced at the V-phase coil 1b. In addition, current flows from the positive electrode of the high-voltage battery 3 to the W-phase coil 1c. As a result, a magnetic field is produced at the W-phase coil 1c.

Therefore, the rotor is attracted to the combined magnetic field of the magnetic field produced by the W-phase coil 1c and the magnetic field produced by the V-phase coil 1b. That is, the position of the rotor is determined by the combined magnetic field.

When the predetermined period of time or a longer time has passed after the execution of control by the initial state and positioning control unit 53A has been started, the following processing is carried out at S250A: the output voltage Vc of the capacitor 30 is considered to be equal to or higher than the target voltage value Vt and an affirmative determination is made. Consequently, control of the state of charge of the capacitor 30 and positioning of the rotor are determined to have been completed and the control by the initial state and positioning control unit 53A is terminated.

In the third embodiment, the following case has been taken as an example: a case where the initial state and positioning control unit 53A carries out control until the output voltage Vc of the capacitor 30 is determined to have reached the target voltage value Vt. Instead, a temperature sensor 31 for detecting the temperature of the capacitor 30 may be used. In this case, the initial state and positioning control unit 53A carries out control until the output voltage of the capacitor 30 reaches the target voltage value and the temperature of the capacitor 30 is determined to be at a predetermined value or more. This makes it possible to suppress passage of large current through the capacitor 30 as described above.

In the third embodiment, the following case has been taken as an example: a case where the positive electrode of the capacitor 30 is connected to the positive pole bus 22 and the negative electrode of the capacitor 30 is connected to the neutral point 1x of the stator coil 1. However, the invention is not limited to this and the positive electrode of the capacitor 30 may be connected to the positive pole bus 22 with the negative electrode of the capacitor 30 connected to the negative pole bus 21.

In the third embodiment, the following case has been taken as an example: a case where the positive electrode of the high-voltage battery 3 is connected to the neutral point 1x of the stator coil 1 and the negative electrode of the high-voltage battery 3 is connected to the negative pole bus 21. Instead, the positive electrode of the high-voltage battery 3 may be connected to the positive pole bus 22 with the negative electrode of the high-voltage battery 3 connected to the neutral point 1x of the stator coil 1.

In this case, the positive electrode of the capacitor 30 may be connected to the positive pole bus 22 with the negative electrode of the capacitor 30 connected to the negative pole bus 21. Alternatively, the positive electrode of the capacitor 30 may be connected to the neutral point 1x of the stator coil 1 with the negative electrode of the capacitor 30 connected to the negative pole bus 21.

In the driving device 10 in which the high-voltage battery 3 is connected between the positive pole bus 22 and the neutral point 1x of the stator coil 1 as described above, the following takes place: the processing of controlling the switching elements SW1 to SW6 to charge the capacitor 30 is different from the third embodiment. However, processing by each of the control units 53A, 55, 56 other than the above processing is substantially the same as in the third embodiment.

Fourth Embodiment

In the third embodiment, the following case has been taken as an example: a case where the initial state and positioning control unit 53A for controlling the state of charge of the capacitor 30 and positioning the rotor is caused to carry out control prior to control by the forced commutation control unit 55. In the fourth embodiment, instead, an initial state and synchronization control unit 53B for controlling the state of charge of the capacitor 30 and rotating the rotor is caused to carry out control.

Figure 15:
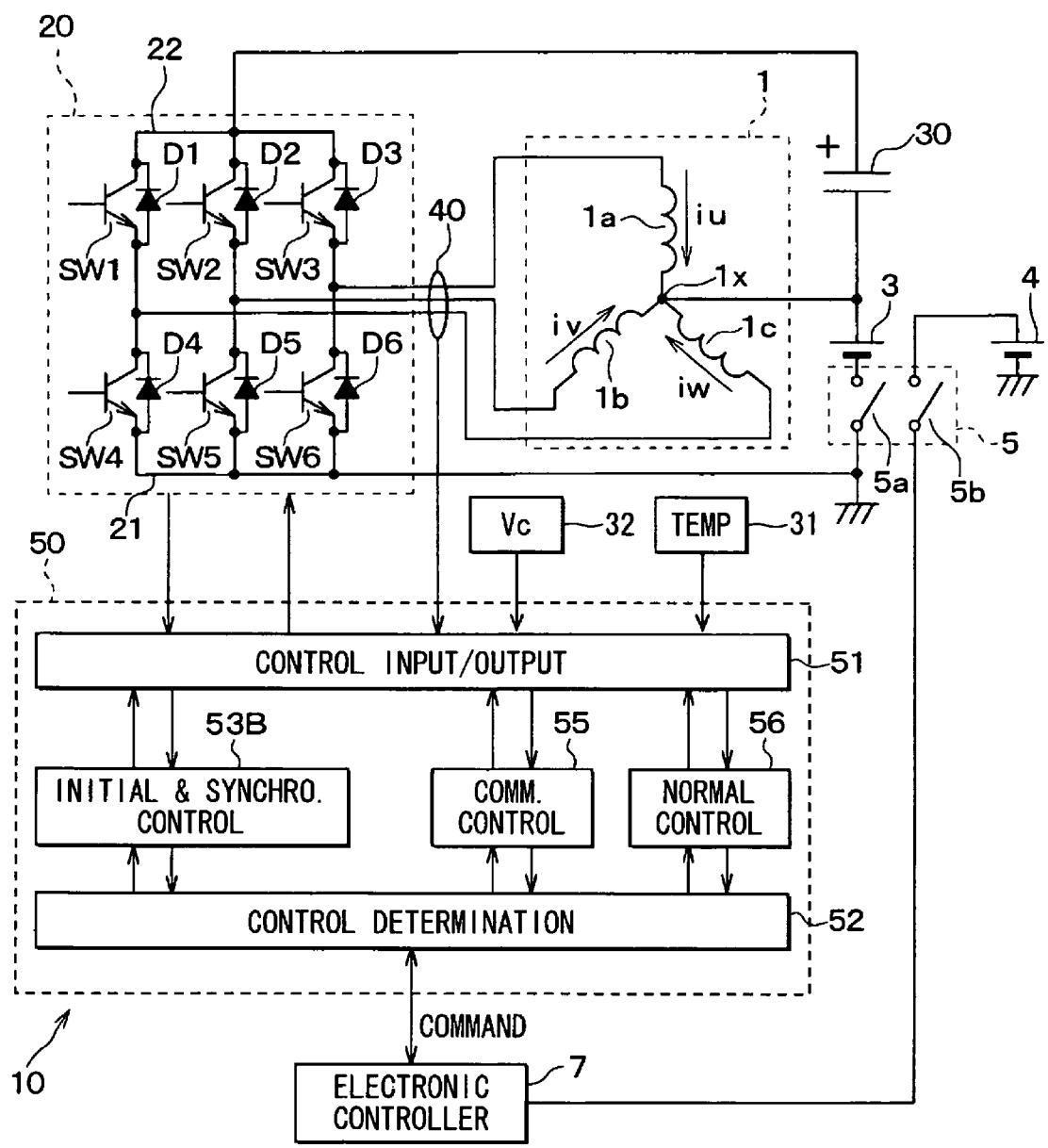
FIG. 15 is a circuit diagram illustrating a driving device for three-phase alternating current synchronous motors in a fourth embodiment of the invention.

As illustrated in FIG. 15, an initial state and synchronization control unit 53B is used in place of the initial state and positioning control unit 53A in FIG. 12. The initial state and synchronization control unit 53B carries out substantially the same control as by the initial state and positioning control unit 53A in FIG. 12 only with the exception that a switching element caused to perform switching operation is different.

The initial state and synchronization control unit 53B causes the switching elements SW4 to SW6 to perform switching operation as illustrated in FIGS. 6A, 6B and 6C.

The initial state and synchronization control unit 53B changes the two switching elements turned on in the order of the switching elements SW4, SW5 to the switching elements SW5, SW6 to the switching elements SW4, SW6 to the switching elements SW4, SW5.

At this time, the combined magnetic field produced by the stator coil 1 is rotated as the two switching elements turned on are changed as described above. As a result, the rotor is rotated clockwise in synchronization with the combined magnetic field.

Concurrently with turning-off of the switching elements SW4 to SW6 on the negative pole bus 21 side, electric charge is stored in the capacitor 30 as in the case of the above initial state and positioning control. The initial state and synchronization control unit 53B carries out control until the output voltage of the capacitor 30 is determined to reach a target voltage value.

According to this embodiment, the initial state and synchronization control unit 53B can implement the following by causing the switching elements SW4 to SW6 to perform switching operation: the state of charge of the capacitor 30 is controlled by storing electric charge in the capacitor and further the rotor is rotated in synchronization with a rotating magnetic field.

In the fourth embodiment, the following case has been taken as an example: a case where the initial state and synchronization control unit 53B carries out control until the output voltage of the capacitor 30 is determined to have reached the target voltage value. Instead, a temperature sensor 31 for detecting the temperature of the capacitor 30 may be used. In this case, the initial state and synchronization control unit 53B carries out control until the output voltage of the capacitor 30 arrives at the target voltage value and the temperature of the capacitor 30 is determined to be at a predetermined value or more. This makes is possible to suppress a passage of large current through the capacitor 30 as described above.

In the fourth embodiment, the following case has been taken as an example: a case where the positive electrode of the capacitor 30 is connected to the positive pole bus 22 and the negative electrode of the capacitor 30 is connected to the neutral point 1x of the stator coil 1. However, the invention is not limited to this and the positive electrode of the capacitor 30 may be connected to the positive pole bus 22 with the negative electrode of the capacitor 30 connected to the negative pole bus 21.

In the fourth embodiment, the following case has been taken as an example: a case where the positive electrode of the high-voltage battery 3 is connected to the neutral point 1x of the stator coil 1 and the negative electrode of the high-voltage battery 3 is connected to the negative pole bus 21. Instead, the positive electrode of the high-voltage battery 3 may be connected to the positive pole bus 22 with the negative electrode of the high-voltage battery 3 connected to the neutral point 1x of the stator coil 1.

In this case, the positive electrode of the capacitor 30 may be connected to the positive pole bus 22 with the negative electrode of the capacitor 30 connected to the negative pole bus 21. Alternatively, the positive electrode of the capacitor 30 may be connected to the neutral point 1x of the stator coil 1 with the negative electrode of the capacitor 30 connected to the negative pole bus 21.

In the driving device 10 in which the high-voltage battery 3 is connected between the positive pole bus 22 and the neutral point 1x of the stator coil 1 as described above, the following takes place: the processing of controlling the switching elements SW1, SW2, . . . , SW6 to charge the capacitor 30 is different from the fourth embodiment. However, processing by each of the control units 53B, 55, 56 other than the above processing is substantially the same as in the fourth embodiment.

In each embodiment, a case where a three-phase alternating current synchronous motor is used as a synchronous motor has been taken as an example. However, the invention is not limited to this and a multi-phase alternating current synchronous motor of four or more phases may be used as a synchronous motor.

What is claimed is:

1. A driving device for synchronous motors which rotates a rotor by a rotating magnetic field produced by a star-connected stator coil, the driving device comprising:
an inverter circuit which has a plurality of pairs of switching elements connected in series and in which the plurality of pairs of switching elements are connected in parallel between a positive pole bus and a negative pole bus;
a capacitor;
a normal operation controlling means configured to cause the plurality of switching elements of the inverter circuit to perform switching operation and thereby output alternating current to the stator coil based on an output voltage of a power supply device and an output voltage of the capacitor to produce the rotating magnetic field by the stator coil; and
an initial state controlling means configured to cause the switching elements to perform switching operation prior to execution of control by the normal operation controlling means and thereby control state of charge of the capacitor, wherein
a positive electrode of the power supply device is connected to a neutral point of the stator coil, and
a negative electrode of the power supply device is connected to the negative pole bus.

2. The driving device for synchronous motors of claim 1, wherein:
a positive electrode of the capacitor is connected to the positive pole bus and a negative electrode of the capacitor is connected to either of the negative pole bus and the neutral point of the stator coil.

3. The driving device for synchronous motors of claim 1, wherein:
a positive electrode of the capacitor is connected to the positive pole bus;
a negative electrode of the capacitor is connected to the negative pole bus;
a positive electrode of the power supply device is connected to the positive pole bus; and
a negative electrode of the power supply device is connected to the neutral point.

4. The driving device for synchronous motors of claim 1, further comprising:
diodes provided for the switching elements and connected in inverse parallel with the switching elements, respectively,
wherein the switching elements include switching elements on a positive pole bus side connected to the positive pole bus and switching elements on a negative pole bus side connected to the negative pole bus, and
wherein the initial state controlling means is configured to control state of charge of the capacitor based on current flowing between the stator coil and the capacitor through the diodes disposed in inverse parallel with the switching elements on the side of the remaining bus, concurrently with turning-off of switching elements on the side of a bus to which either of the positive electrode and the negative electrode of the power supply device is connected among the switching elements on the positive pole bus side and the switching elements on the negative pole bus side.

5. The driving device for synchronous motors of claim 4, wherein:
the initial state controlling means is configured to cause the switching elements on the side of a bus to which either of the positive electrode and the negative electrode of the power supply device is connected among the switching elements on the positive pole bus side and the switching elements on the negative pole bus side to perform switching operation and thereby control a current flowing between the stator coil and the capacitor to or less than a limiting current through the diodes disposed in inverse parallel with the switching elements on the side of the remaining bus.

6. The driving device for synchronous motors of claim 4, wherein:
the initial state controlling means is configured to cause switching elements on the side of a bus to which either of the positive electrode and the negative electrode of the power supply device is connected among the switching elements on the positive pole bus side and the switching elements on the negative pole bus side to perform switching operation with the switching elements on the side of the remaining bus off.

7. The driving device for synchronous motors of claim 4, further comprising:
a synchronization controlling means configured to cause the switching elements of the inverter circuit to perform switching operation before the execution of control by the normal operation controlling means is started after the execution of control by the initial state controlling means is terminated and thereby output alternating current to the stator coil to synchronize the rotor with a rotating magnetic field produced by the stator coil.

8. The driving device for synchronous motors of claim 7, wherein:
the synchronization controlling means is configured to cause the switching elements of the inverter circuit to perform switching operation and thereby gradually increase rotary torque by the rotating magnetic field.

9. The driving device for synchronous motors of claim 7, wherein:
the synchronization controlling means is configured to gradually increase rotary torque from a state in which the rotary torque smaller than torque produced on the load side of the synchronous motor is produced by the rotating magnetic field.

10. The driving device for synchronous motors of claim 7, wherein:

the synchronization controlling means is configured to cause the switching elements on the positive pole bus side and the switching elements on the negative pole bus side to perform switching operation and thereby output alternating current to the stator coil based on the output voltage of the power supply device and the output voltage of the capacitor; and the synchronization controlling means is configured to store electric charge in the capacitor based on current flowing between the stator coil and the capacitor through the diodes disposed in inverse parallel with the switching elements on the side of the remaining bus, concurrently with turning-off of switching elements on the side of a bus to which either of the positive electrode and the negative electrode of the power supply device is connected among the switching elements on the positive pole bus side and the switching elements on the negative pole bus side.

11. The driving device for synchronous motors of claim 7, wherein:

the synchronization controlling means is configured to cause the switching elements on the positive pole bus side and the switching elements on the negative pole bus side to perform switching operation so that the output voltage of the capacitor is kept at the target voltage value.

12. The driving device for synchronous motors of claim 7, wherein:

the synchronization controlling means is configured to cause switching elements on the side of a bus to which either of the positive electrode and the negative electrode of the power supply device is connected among the switching elements on the positive pole bus side and the switching elements on the negative pole bus side to perform switching operation with the switching elements on the side of the remaining bus off and thereby produce a rotating magnetic field by the stator coil based on alternating current outputted from the inverter circuit.

13. The driving device for synchronous motors of claim 7, wherein:

the synchronization controlling means is configured to output alternating current equivalent to an electrical angle of 90 degrees or more from the inverter circuit to the stator coil.

14. The driving device for synchronous motors of claim 13, wherein:

the synchronization controlling means is configured to output alternating current equivalent to an integral multiple of an electrical angle of 360 degrees from the inverter circuit to the stator coil.

15. The driving device for synchronous motors of claim 7, wherein:

the synchronization controlling means is configured to reduce a rotational speed of the rotating magnetic field to a value lower than the rotational speed of the rotating magnetic field at time of execution of control by the normal operation controlling means.

16. The driving device for synchronous motors of claim 4, further comprising:

a positioning controlling means configured to cause the switching elements of the inverter circuit to perform switching operation before the execution of control by the normal operation controlling means is started after the execution of control by the initial state controlling means is terminated and thereby output current from the inverter circuit to the stator coil and attract the rotor by a magnetic field produced by the stator coil based on the outputted alternating current to position the rotor.

17. The driving device for synchronous motors of claim 16, wherein:

the positioning controlling means is configured to cause the switching elements on the positive pole bus side and the switching elements on the negative pole bus side to perform switching operation and thereby output current to the stator coil based on the output voltage of the power supply device and the output voltage of the capacitor; and the positioning controlling means is configured to store electric charge in the capacitor based on current flowing between the stator coil and the capacitor through the diodes disposed in inverse parallel with the switching elements on the side of the remaining bus, concurrently with turning-off of switching elements on the side of a bus to which either of the positive electrode and the negative electrode of the power supply device is connected among the switching elements on the positive pole bus side and the switching elements on the negative pole bus side.

18. The driving device for synchronous motors of claim 16, wherein:

the positioning controlling means outputs current equivalent to an electrical angle of 90 degrees or more from the inverter circuit to the stator coil.

19. The driving device for synchronous motors of claim 18, wherein:

the positioning controlling means outputs alternating current equivalent to an integral multiple of an electrical angle of 360 degrees from the inverter circuit to the stator coil.

20. The driving device for synchronous motors of claim 16, further comprising:

a forced commutation controlling means configured to cause the switching elements of the inverter circuit to perform switching operation so that a current for increasing the rotational speed of the rotor to a certain speed is outputted from the inverter circuit to the stator coil before the execution of control by the normal operation controlling means is started after the execution of control by the positioning controlling means is terminated.

21. The driving device for synchronous motors of claim 1, wherein:

the initial state controlling means is configured to control state of charge of the capacitor until the output voltage of the capacitor is determined to have reached a target voltage value.

22. The driving device for synchronous motors of claim 1, wherein:

the initial state controlling means is configured to control state of charge of the capacitor until the output voltage of the capacitor reaches a certain voltage and temperature of the capacitor is determined to be at a predetermined value or more.

23. The driving device for synchronous motors of claim 1, further comprising:

a current sensor for detecting current flowing from the inverter circuit to the stator coil, wherein the normal operation controlling means is configured to estimate number of rotations of the rotor based on a current detected by the current sensor and causes the switching elements to perform switching operation so that the number of rotations of the rotor is brought close to a target number of rotations based on the estimated number of rotations.

24. The driving device for synchronous motors of claim 1, comprising:
a forced commutation controlling means which causes the switching elements of the inverter circuit to perform switching operation so that an alternating current signal for increasing the rotational speed of the rotor to a certain speed is outputted from the inverter circuit to the stator coil before the execution of control by the normal operation controlling means is started after the execution of control by the synchronization controlling means is terminated.

25. A driving device for synchronous motors which rotates a rotor by a rotating magnetic field produced by a star-connected stator coil, the driving device comprising:
an inverter circuit which has a plurality of pairs of switching elements connected in series and in which the plurality of pairs of switching elements are connected in parallel between a positive pole bus and a negative pole bus;
a capacitor;
a normal operation controlling means configured to cause the plurality of switching elements of the inverter circuit to perform switching operation and thereby output alternating current to the stator coil based on an output voltage of a power supply device and an output voltage of the capacitor to produce the rotating magnetic field by the stator coil; and
an initial state and synchronization controlling means configured to cause the switching elements to perform switching operation prior to execution of control by the normal operation controlling means and thereby synchronize the rotor with a rotating magnetic field produced by the stator coil and further control state of charge of the capacitor, wherein
a positive electrode of the power supply device is connected to a neutral point of the stator coil, and
a negative electrode of the power supply device is connected to the negative pole bus.

26. The driving device for synchronous motors of claim 25, wherein:
a positive electrode of the capacitor is connected to the positive pole bus and a negative electrode of the capacitor is connected to either of the negative pole bus and the neutral point of the stator coil.

27. The driving device for synchronous motors of claim 25, wherein:
a positive electrode of the capacitor is connected to the positive pole bus;
a negative electrode of the capacitor is connected to the negative pole bus;
a positive electrode of the power supply device is connected to the positive pole bus; and
a negative electrode of the power supply device is connected to the neutral point of the stator coil.

28. The driving device for synchronous motors of claim 25, further comprising:
diodes provided for each of the switching elements and connected in inverse parallel with the switching elements, respectively,
wherein the switching elements include switching elements on the positive pole bus side connected to the positive pole bus and switching elements on the negative pole bus side connected to the negative pole bus, and
wherein the initial state and synchronization controlling means is configured to control the state of charge of the capacitor based on current flowing between the stator coil and the capacitor through the diodes disposed in inverse parallel with the switching elements on the side of the remaining bus, concurrently with turning-off of switching elements on the side of a bus to which either of the positive electrode and the negative electrode of the power supply device is connected among the switching elements on the positive pole bus side and the switching elements on the negative pole bus side.

29. The driving device for synchronous motors of claim 28, wherein:
the initial state and synchronization controlling means is configured to cause switching elements on the side of a bus to which either of the positive electrode and the negative electrode of the power supply device is connected among the switching elements on the positive pole bus side and the switching elements on the negative pole bus side to perform switching operation and thereby controls a current flowing between the stator coil and the capacitor to or less than a limiting current through the diodes disposed in inverse parallel with the switching elements on the side of the remaining bus.

30. The driving device for synchronous motors of claim 28, further comprising:
a current sensor for detecting current flowing from the inverter circuit to the stator coil,
wherein the normal operation controlling means is configured to estimate number of rotations of the rotor, based on the current detected by the current sensor and cause the switching elements to perform switching operation so that the number of rotations of the rotor is brought close to a target number of rotations based on the estimated number of rotations.

31. The driving device for synchronous motors of claim 28, wherein:
the initial state and synchronization controlling means is configured to cause the switching elements on the side of a bus to which either of the positive electrode and the negative electrode of the power supply device is connected among the switching elements on the positive pole bus side and the switching elements on the negative pole bus side to perform switching operation with the switching elements on the side of the remaining bus off and thereby produce a rotating magnetic field by the stator coil based on alternating current outputted from the inverter circuit.

32. The driving device for synchronous motors of claim 25, wherein:
the initial state and synchronization controlling means is configured to control state of charge until the output voltage of the capacitor is determined to have reached a certain voltage.

33. The driving device for synchronous motors of claim 25, wherein:
the initial state and synchronization controlling means is configured to control the state of charge until the output voltage of the capacitor reaches a certain voltage and temperature of the capacitor is determined to be at a predetermined value or more.

34. The driving device for synchronous motors of claim 25, further comprising:
a forced commutation controlling means configured to cause the switching elements of the inverter circuit to perform switching operation so that a current for increasing the rotational speed of the rotor to a certain speed is outputted from the inverter circuit to the stator coil before execution of control by the normal operation controlling means is started after execution of control by the initial state and synchronization controlling means is terminated.

35. A driving device for synchronous motors which rotates a rotor by a rotating magnetic field produced by a star-connected stator coil, the driving device comprising:
an inverter circuit which has a plurality of pairs of switching elements connected in series and in which the plurality of pairs of switching elements are connected in parallel between a positive pole bus and a negative pole bus;
a capacitor;
a normal operation controlling means configured to cause the plurality of switching elements of the inverter circuit to perform switching operation and thereby output alternating current to the stator coil based on output voltage of a power supply device and output voltage of the capacitor to produce the rotating magnetic field by the stator coil; and
an initial state and positioning controlling means configured to cause the switching elements to perform switching operation prior to execution of control by the normal operation controlling means and thereby attract the rotor to a magnetic field produced by the stator coil to position the rotor and further control the state of charge of the capacitor, wherein
a positive electrode of the power supply device is connected to a neutral point of the stator coil, and
a negative electrode of the power supply device is connected to the negative pole bus.

36. The driving device for synchronous motors of claim 35, wherein:
a positive electrode of the capacitor is connected to the positive pole bus and a negative electrode of the capacitor is connected to either of the negative pole bus and the neutral point of the stator coil.

37. The driving device for synchronous motors of claim 35, wherein:
a positive electrode of the capacitor is connected to the positive pole bus;
a negative electrode of the capacitor is connected to the negative pole bus;
a positive electrode of the power supply device is connected to the positive pole bus; and
a negative electrode of the power supply device is connected to the neutral point of the stator coil.

38. The driving device for synchronous motors of claim 35, further comprising:
diodes provided for the switching elements and connected in inverse parallel with the switching elements, respectively,
wherein the switching elements include switching elements on the positive pole bus side connected to the positive pole bus and switching elements on the negative pole bus side connected to the negative pole bus,
wherein the initial state and positioning controlling means is configured to control state of charge of the capacitor based on current flowing between the stator coil and the capacitor through the diodes disposed in inverse parallel with the switching elements on the side of the remaining bus, concurrently with turning-off of the switching elements on the side of a bus to which either of the positive electrode and the negative electrode of the power supply device is connected among the switching elements on the positive pole bus side and the switching elements on the negative pole bus side.

39. The driving device for synchronous motors of claim 38, wherein:
the initial state and positioning controlling means is configured to cause the switching elements on the side of a bus to which either of the positive electrode and the negative electrode of the power supply device is connected to perform switching operation and thereby controls current flowing between the stator coil and the capacitor with the switching elements on the side of the remaining bus bypassed to or less than a limiting current.

40. The driving device for synchronous motors of claim 35, further comprising:
a current sensor for detecting current flowing from the inverter circuit to the stator coil,
wherein the normal operation controlling means is configured to estimate number of rotations of the rotor based on current detected by the current sensor and cause the switching elements to perform switching operation so that the number of rotations of the rotor is brought close to a target number of rotations based on the estimated number of rotations.

41. The driving device for synchronous motors of claim 35, wherein:
the initial state and positioning controlling means is configured to control state of charge until the output voltage of the capacitor is determined to have reached a certain voltage.

42. The driving device for synchronous motors of claim 35, wherein:
the initial state and positioning controlling means is configured to control state of charge until the output voltage of the capacitor reaches a certain voltage and temperature of the capacitor is determined to be at a predetermined value or more.

43. The driving device for synchronous motors of claim 35, wherein:
the initial state and positioning controlling means is configured to cause switching elements on the side of a bus to which either of the positive electrode and the negative electrode of the power supply device is connected among the switching elements on the positive pole bus side and the switching elements on the negative pole bus side to perform switching operation with the switching elements on the side of the remaining bus off and thereby produce a magnetic field to the stator coil based on current outputted from the inverter circuit.

44. The driving device for synchronous motors of claim 35, further comprising:
a forced commutation controlling means configured to cause the switching elements of the inverter circuit to perform switching operation so that current for increasing a rotational speed of the rotor to a certain speed is outputted from the inverter circuit to the stator coil before execution of control by the normal operation controlling means is started after the execution of control by the initial state and positioning controlling means is terminated.

45. The driving device for synchronous motors of claim 35, wherein:
the synchronous motor is not equipped with a sensor for detecting information on the position of the rotor.

* * * * *